United States Patent
Masuda et al.

(10) Patent No.: US 7,634,344 B2
(45) Date of Patent: Dec. 15, 2009

(54) DRIVING FORCE CONTROL APPARATUS FOR AUTOMOTIVE VEHICLES

(75) Inventors: Rei Masuda, Yokohama (JP); Kouichi Shimizu, Kanagawa (JP)

(73) Assignee: Nissan Motor Co., Ltd., Yokohama-shi (JP)

(*) Notice: Subject to any disclaimer, the term of this patent is extended or adjusted under 35 U.S.C. 154(b) by 927 days.

(21) Appl. No.: 11/145,186

(22) Filed: Jun. 6, 2005

(65) Prior Publication Data

US 2005/0278104 A1 Dec. 15, 2005

(30) Foreign Application Priority Data

Jun. 10, 2004 (JP) .............................. 2004-172588

(51) Int. Cl.
*B60K 31/00* (2006.01)
(52) U.S. Cl. ......................................... 701/69; 180/242
(58) Field of Classification Search .................. 701/69; 477/107; 180/242, 243, 197, 65.2, 65.4
See application file for complete search history.

(56) References Cited

U.S. PATENT DOCUMENTS 5,368,120 A * 11/1994 Sakai et al. .................. 180/197
5,803,197 A * 9/1998 Hara et al. .................. 180/248

FOREIGN PATENT DOCUMENTS

| EP | 1 205 331 A2 | 5/2002 |
| GB | 2 392 892 A | 3/2004 |
| JP | 07-231508 A | 8/1995 |
| JP | 2002-078105 A | 3/2002 |
| JP | 2003-193877 A | 7/2003 |

OTHER PUBLICATIONS

U.S. Appl. No. 11/144,609, filed Jun. 6, 2005, Matsuda.
U.S. Appl. No. 11/145,175, filed Jun. 6, 2005, Matsuda.

* cited by examiner

*Primary Examiner*—Dalena Tran
(74) *Attorney, Agent, or Firm*—Foley & Lardner LLP

(57) ABSTRACT

In a driving force control apparatus for an automotive vehicle employing an engine that drives a main drive wheel, a generator driven by the engine, and a motor driven by an electric power output generated by the generator to drive a subsidiary drive wheel, a subsidiary-drive-wheel acceleration slip estimation circuitry is provided to estimate a subsidiary-drive-wheel acceleration slip rate. An electric power output suppression circuitry is provided to suppress the electric power output of the generator when the estimated subsidiary-drive-wheel acceleration slip rate exceeds a predetermined slip rate. Also provided is a subsidiary-drive-wheel acceleration-slip period engine output torque reduction circuitry that reduces an engine output torque responsively to suppressing the electric power output.

21 Claims, 11 Drawing Sheets

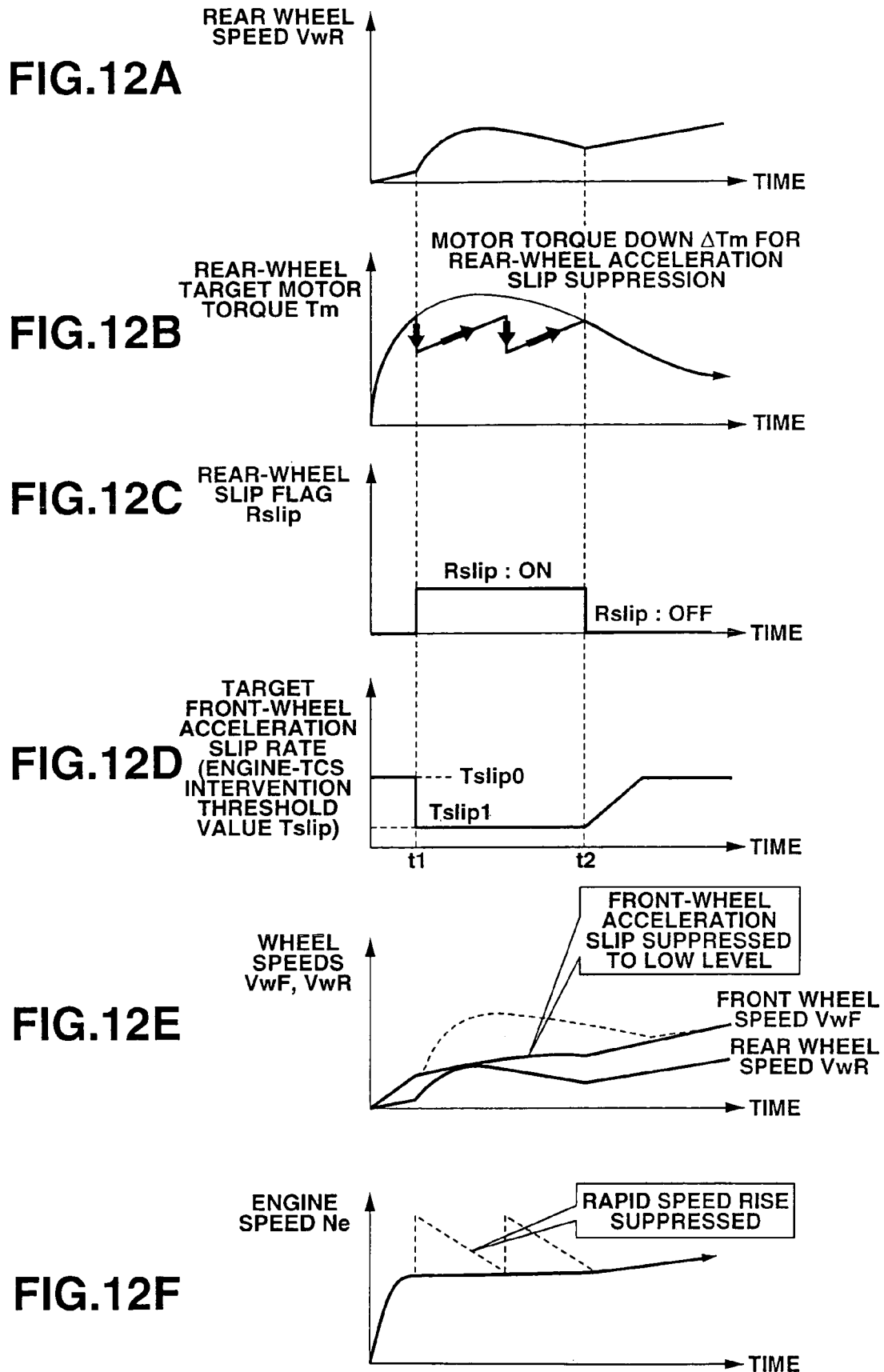

DRIVING FORCE CONTROL APPARATUS FOR AUTOMOTIVE VEHICLES

TECHNICAL FIELD

The present invention relates to a driving force control apparatus for automotive vehicles, and specifically to a vehicle driving force control apparatus capable of driving a generator by an internal combustion engine that drives main drive wheels and supplying electric power generated by the generator to a motor that drives subsidiary drive wheels.

BACKGROUND ART

In recent years, there have been proposed and developed various vehicle driving force control apparatus in which main drive wheels (either front or rear road wheels) are driven by an engine and subsidiary drive wheels (the remaining road wheels) are driven by a motor. One such vehicle driving force control apparatus has been disclosed in Japanese Patent Provisional Publication No. 7-231508 (hereinafter is referred to as "JP7-231508"). In the vehicle driving force control apparatus disclosed in JP7-231508, a generator is driven by an engine, whereas a motor is driven by electric energy generated by the generator. The electric energy, which is supplied from the generator to the motor, is controlled depending on a state of the vehicle, estimated based on, for example, a deviation between a standard wheel speed based on an accelerator opening and a front wheel speed, a deviation between the standard wheel speed and a rear wheel speed, and a deviation between the front and rear wheel speeds.

SUMMARY OF THE INVENTION

In the vehicle driving force control apparatus as disclosed in JP7-231508, suppose that a control system is designed to suppress or reduce electric power output of the generator for reducing a driving force of each individual subsidiary drive wheel exceeding a grip force limit and for recovering the grip force of the subsidiary drive wheel on the road, when acceleration slip greater than a predetermined slip rate takes place at the subsidiary drive wheels. Under such an acceleration slip condition of the subsidiary drive wheels, the control system operates to suppress or reduce the generator's electric power output depending on the detected subsidiary-drive-wheel slip rate. On the one hand, suppressing the generator's electric power output contributes to the enhanced or improved convergence performance of acceleration-slip suppression control for the subsidiary drive wheel side. On the other hand, suppressing the generator's electric power output means that the generator's load carried on the engine is rapidly reduced or released, thus deteriorating the convergence performance of acceleration-slip suppression control for the main drive wheel side.

Accordingly, it is an object of the invention to provide a vehicle driving force control apparatus capable of effectively suppressing acceleration slip of a subsidiary drive wheel side without deteriorating a convergence performance of acceleration-slip suppression for a main drive wheel side.

In order to accomplish the aforementioned and other objects of the present invention, a driving force control apparatus for an automotive vehicle employing an engine that drives a main drive wheel, a generator driven by the engine, and a motor driven by an electric power output generated by the generator to drive a subsidiary drive wheel, comprises a subsidiary-drive-wheel acceleration slip estimation circuitry that estimates an acceleration slip rate of the subsidiary drive wheel, an electric power output suppression circuitry that suppresses the electric power output of the generator when the estimated subsidiary-drive-wheel acceleration slip rate exceeds a predetermined slip rate, and a subsidiary-drive-wheel acceleration-slip period engine output torque reduction circuitry that reduces an engine output torque responsively to suppressing the electric power output.

According to another aspect of the invention, a driving force control apparatus for an automotive vehicle employing an engine that drives a main drive wheel, a generator driven by the engine, and a motor driven by an electric power output generated by the generator to drive a subsidiary drive wheel, comprises a subsidiary-drive-wheel acceleration slip estimation circuitry that estimates an acceleration slip rate of the subsidiary drive wheel, an electric power output suppression circuitry that suppresses the electric power output of the generator by a reduced value when the estimated subsidiary-drive-wheel acceleration slip rate exceeds a predetermined slip rate, and a target engine output torque reduction circuitry that reduces a target engine output torque by a load torque value corresponding to the reduced value of the electric power output responsively to suppressing the electric power output.

According to a further aspect of the invention, a driving force control apparatus for an automotive vehicle employing an engine that drives a main drive wheel, a generator driven by the engine, and a motor driven by an electric power output generated by the generator to drive a subsidiary drive wheel, comprises a subsidiary-drive-wheel acceleration slip estimation circuitry that estimates an acceleration slip rate of the subsidiary drive wheel, an electric power output suppression circuitry that suppresses the electric power output of the generator when the estimated subsidiary-drive-wheel acceleration slip rate exceeds a predetermined slip rate, a main-drive-wheel acceleration slip estimation circuitry that estimates an acceleration slip rate of the main drive wheel, a main-drive-wheel acceleration-slip period engine output torque suppression circuitry that suppresses the engine output torque by a reduced value determined based on the estimated main-drive-wheel acceleration slip rate regardless of a driver-required vehicle acceleration when the estimated main-drive-wheel acceleration slip rate exceeds an engine traction-control-system (TCS) intervention threshold value, and an acceleration slip threshold value alteration circuitry that alters the TCS intervention threshold value to a predetermined low threshold value lower than an initial threshold value, when the estimated subsidiary-drive-wheel acceleration slip rate exceeds the predetermined slip rate.

According to a still further aspect of the invention, an automotive vehicle comprises an engine that drives a main drive wheel, a generator driven by the engine, a motor driven by an electric power output generated by the generator for driving a subsidiary drive wheel, sensors that detect slip conditions of the main drive wheel and the subsidiary drive wheel, and a controller being configured to be electrically connected to the engine, the motor, the generator, and the sensors, for controlling driving forces applied to the main drive wheel and the subsidiary drive wheel, the controller comprising a subsidiary-drive-wheel acceleration slip estimation circuitry that estimates, based on the slip condition of the subsidiary drive wheel, a subsidiary-drive-wheel acceleration slip rate, an electric power output suppression circuitry that suppresses the electric power output of the generator when the estimated subsidiary-drive-wheel acceleration slip rate exceeds a predetermined slip rate, and a subsidiary-drive-wheel acceleration-slip period engine output torque reduction circuitry that reduces an engine output torque responsively to suppressing the electric power output.

According to another aspect of the invention, a driving force control apparatus for an automotive vehicle employing an engine that drives a main drive wheel, a generator driven by the engine, and a motor driven by an electric power output generated by the generator to drive a subsidiary drive wheel, comprises subsidiary-drive-wheel acceleration slip estimation means for estimating an acceleration slip rate of the subsidiary drive wheel, electric power output suppression means for suppressing the electric power output of the generator when the estimated subsidiary-drive-wheel acceleration slip rate exceeds a predetermined slip rate, and subsidiary-drive-wheel acceleration-slip period engine output torque reduction means for reducing an engine output torque responsively to suppressing the electric power output.

According another aspect of the invention, a method of controlling driving forces applied to a main drive wheel and a subsidiary drive wheel of an automotive vehicle employing an engine that drives the main drive wheel, a generator driven by the engine, and a motor driven by an electric power output generated by the generator to drive the subsidiary drive wheel, the method comprises estimating an acceleration slip rate of the subsidiary drive wheel, suppressing the electric power output of the generator when the estimated subsidiary-drive-wheel acceleration slip rate exceeds a predetermined slip rate, and reducing an engine output torque responsively to suppressing the electric power output.

According to another aspect of the invention, a method of controlling driving forces applied to a main drive wheel and a subsidiary drive wheel of an automotive vehicle employing an engine that drives the main drive wheel, a generator driven by the engine, a motor driven by an electric power output generated by the generator to drive the subsidiary drive wheel, and sensors that detect slip velocities of the main drive wheel and the subsidiary drive wheel and a driver-required vehicle acceleration, the method comprises estimating, based on the slip velocity of the main drive wheel, a main-drive-wheel acceleration slip rate, estimating, based on the slip velocity of the subsidiary drive wheel, a subsidiary-drive-wheel acceleration slip rate, calculating a first target motor torque based on the slip velocity of the main drive wheel, calculating a second target motor torque based on the driver-required vehicle acceleration, selecting a higher one of the first and second target motor torques as a target motor torque, reducing the target motor torque by a reduced torque value determined based on the estimated subsidiary-drive-wheel acceleration slip rate when the estimated subsidiary-drive-wheel acceleration slip rate exceeds a predetermined slip rate, suppressing the electric power output of the generator by a reduced value corresponding to the reduced torque value when the estimated subsidiary-drive-wheel acceleration slip rate exceeds the predetermined slip rate, and reducing an engine output torque responsively to suppressing the electric power output.

The other objects and features of this invention will become understood from the following description with reference to the accompanying drawings.

BRIEF DESCRIPTION OF THE DRAWINGS

FIGS. 12A-12F are time charts explaining the operation of the modified vehicle driving force control apparatus employing the motor TCS section executing the routine of FIG. 11 and the engine controller executing the routine of FIG. 10.

DESCRIPTION OF THE PREFERRED EMBODIMENTS

Figure 1:
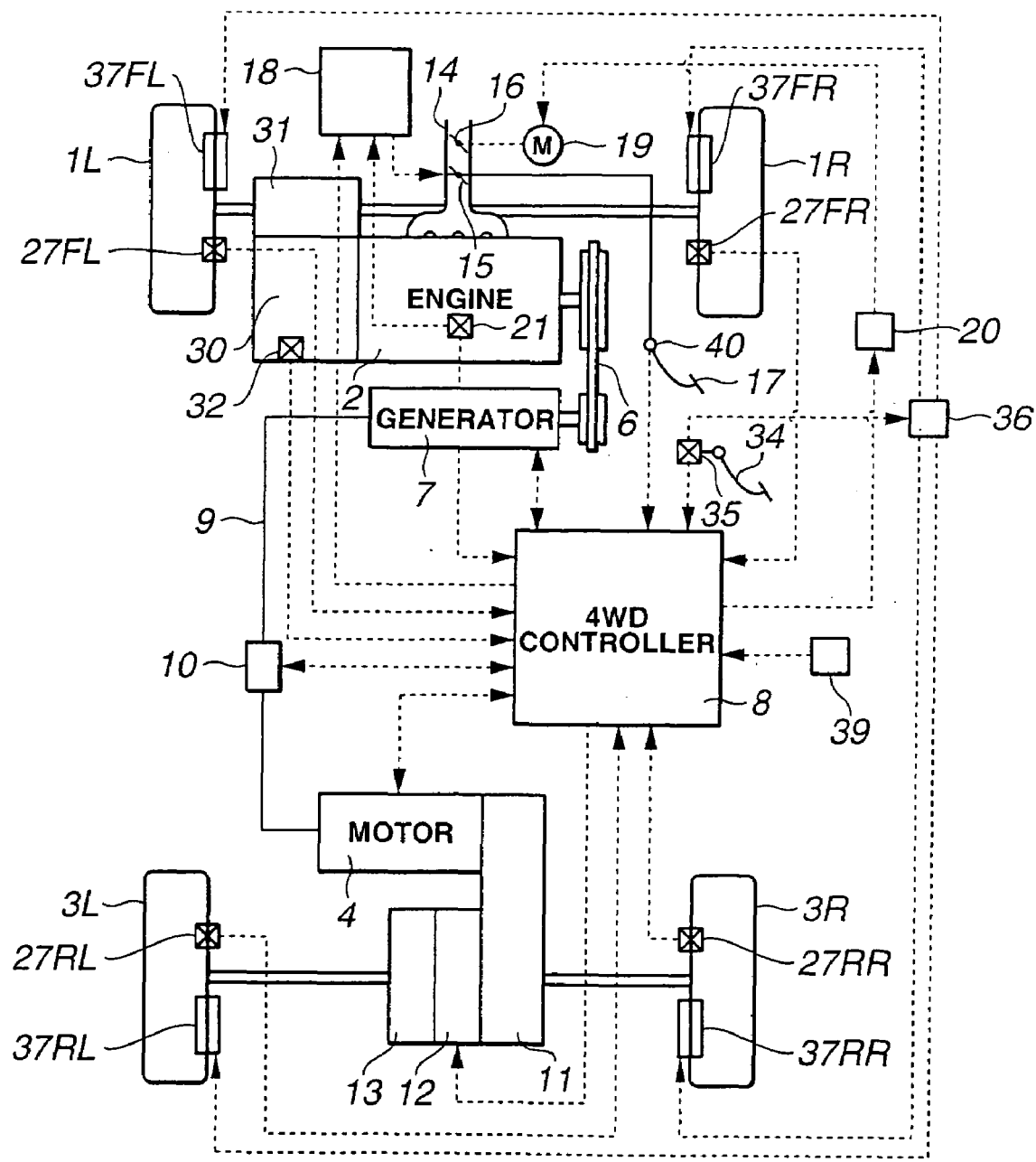
FIG. 1 is a system diagram illustrating an embodiment of a vehicle driving force control apparatus.

Referring now to the drawings, particularly to FIG. 1, the vehicle driving force control apparatus of the embodiment is exemplified in a four-wheel-drive (4WD) vehicle in which front-left and front-right road wheels 1L and 1R are main drive wheels driven by an engine 2, and rear-left and rear-right road wheels 3L and 3R are subsidiary drive wheels driven by a motor 4. An output torque Te produced by engine 2 is transmitted through a transmission 30 and a front differential gear 31 to front-left and front-right road wheels 1L and 1R.

A shift position detector (or a shift position detecting device) 32 is provided in or attached to transmission 30 for detecting a selected operating range of the transmission and for generating a shift position signal indicative of the selected operating range to a 4WD controller 8. The automatic shift sequence of transmission 30 is performed responsively to an automatic shift command from an electronic transmission controller (not shown). Memories (RAM, ROM) of the transmission controller store the information program concerning a shift schedule based on a vehicle speed Vv and an accelerator opening θ as a preprogrammed look-up table or a preprogrammed map. The transmission controller determines, based on the latest up-to-date information about vehicle speed Vv and accelerator opening θ, a timing of shifting action (an upshift or a downshift) passing through a shifting point, from the information program, and generates a shift command to transmission 30.

As clearly shown in FIG. 1, a main throttle valve 15 and a sub-throttle valve 16 are provided in an intake pipe (or an intake manifold) 14 of engine 2. The main throttle opening of main throttle valve 15 is adjusted or controlled depending on the amount of depression of an accelerator pedal 17 that serves as an accelerator-opening indicating device or a driver-required vehicle-acceleration-indication operating component part. Main throttle valve 15 is mechanically linked to accelerator pedal 17 such that the main throttle valve opening can be adjusted or controlled in synchronism with the amount of depression of accelerator pedal 17. Alternatively, main throttle valve 15 may be electronically controlled by means of an engine controller 18 such that the main throttle valve opening is adjusted or controlled responsively to an accelerator position signal from an accelerator sensor 40 that detects the amount of depression of accelerator pedal 17, in other words, the accelerator-pedal angular position. The accelerator position signal (indicative of accelerator opening θ) from accelerator sensor 40 is also output into the input/output interface (I/O) of 4WD controller 8. On the other hand, sub-throttle valve 16 is electronically controlled by means of a step motor controller 20 electrically connected to 4WD controller 8. In more detail, sub-throttle valve 16 is driven by a step motor 19, serving as a sub-throttle actuator. Step motor 19 rotates in short and essentially uniform angular movements rather than continuously. Angular steps of step motor 19 are obtained electromagnetically. A sub-throttle valve opening α of sub-throttle valve 16 is controlled depending on a rotation angle (e.g., 30°, 45°, 90°, and the like) corresponding to the number of angular steps of step motor 19. The rotation angle of step motor 19 is adjusted or controlled in response to a drive signal from step motor controller 20. Although it is not clearly shown in FIG. 1, a sub-throttle position sensor, simply, a throttle sensor (see FIG. 2) is located at sub-throttle valve 16. The number of angular steps of step motor 19 is feedback-controlled based on the detected sub-throttle valve opening α sensed by the throttle sensor. Actually, the sub-throttle valve opening α of sub-throttle valve 16 is adjusted or controlled to a valve opening less than or equal to the main throttle valve opening of main throttle valve 15, so that the output torque Te of engine 2 can be controlled independently of the manipulated variable of accelerator pedal 17 depressed by the driver.

An engine speed sensor 21 is provided to detect engine speed Ne of engine 2. The sensor signal from engine speed sensor 21 is output to engine controller 18 as well as 4WD controller 8. Engine controller 18 is electrically connected to 4WD controller 8 to communicate with the 4WD controller 8 through a data link (a plurality of signal lines). For instance, information about at least wheel speeds of four road wheels 1L, 1R, 3L and 3R and a state of a rear-wheel acceleration-slip indicative flag (simply, a rear-wheel slip flag) Rslip (described later) is sent from 4WD controller 8 to engine controller 18.

A brake pedal stroke sensor (simply, a brake stroke sensor) 35 is provided to detect a brake-pedal stroke of a brake pedal 34. The sensor signal from brake pedal stroke sensor 35 is output to a brake controller 36 as well as 4WD controller 8.

The central processing unit (CPU) of brake controller 36 allows the access by the I/O interface of input information data signal from brake pedal stroke sensor 35 so as to control a braking force applied to the vehicle, exactly, four braking torques (braking forces) applied to road wheels 1L, 1R, 3L, and 3R, via respective braking devices, namely a front-left braking device (e.g., a FL disc brake) 37FL, a front-right braking device (e.g., a FR disc brake) 37FR, a rear-left braking device (e.g., a RL disc brake) 37RL, and a rear-right braking device (e.g., a RR disc brake) 37RR.

A drive mode selector switch (simply, a drive mode switch) 39 is also provided to generate a 2WD-to-4WD mode switching signal (simply, a 4WD mode signal) or a 4WD-to-2WD mode switching signal (simply, a 2WD mode signal) to the input interface circuitry of 4WD controller 8.

As can be seen from the system diagram of FIG. 1, part of engine output torque Te is transmitted through an endless belt 6, wound on an engine-side pulley and a generator-side pulley, to generator 7, such that generator 7 is driven or rotated at a generator speed Nh, which is obtained by multiplying engine speed Ne with a pulley ratio between the engine-side pulley and the generator-side pulley. Therefore, generator speed Nh of generator 7 is arithmetically calculated based on engine speed Ne as a product of the pulley ratio and engine speed Ne.

Figure 2:
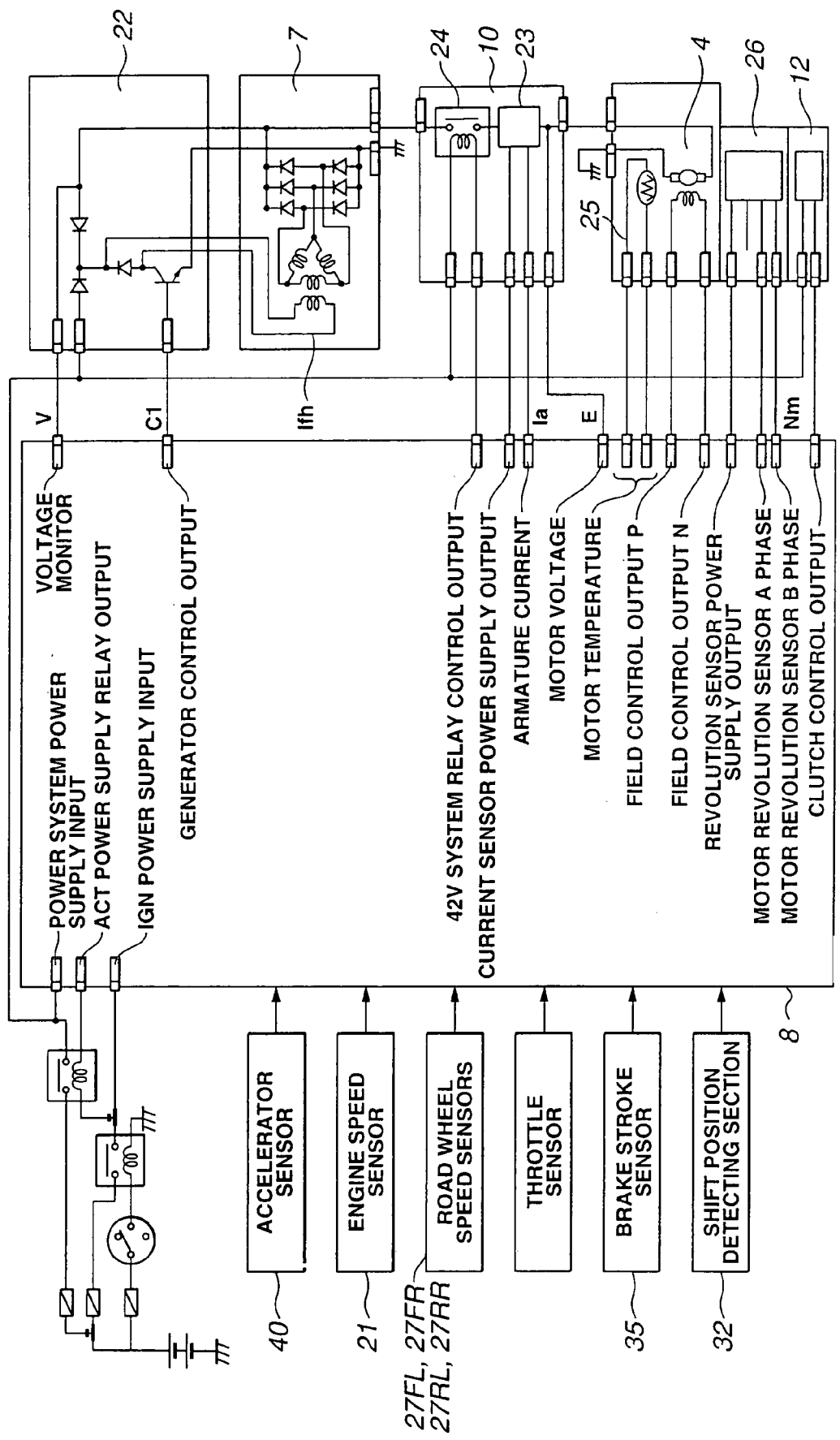
FIG. 2 is an electronic control system wiring diagram of a 4WD controller incorporated in the vehicle driving force control apparatus of the embodiment.

Referring now to FIG. 2, there is shown the control system wiring diagram of 4WD controller 8 of the vehicle driving force control apparatus of the embodiment of FIG. 1. As can be seen from the circuit diagram of FIG. 2, generator 7 is equipped with a voltage regulator 22 that regulates an output voltage Vg of generator 7. A field current Ifh of generator 7 is adjusted or controlled responsively to a generator control command (a given duty ratio) C1 generated from a generator control section 8F (described later in reference to the block diagram shown in FIG. 3) of 4WD controller 8 to voltage regulator 22 of generator 7. That is, the generator's load carried on engine 2, in other words, a surplus engine torque Th (described later), and generator output voltage Vg are both controlled or regulated by adjusting generator field current Ifh. In more detail, voltage regulator 22 receives a generator control command (a given duty ratio) C1 from generator control section 8F, and acts to regulate generator field current Ifh responsively to the generator control command C1 (the given duty ratio). Voltage regulator 22 is configured to be electrically connected to generator 7, in a manner so as to output the regulated generator output voltage Vg to 4WD controller 8, while detecting the regulated generator output voltage Vg. As can be seen from the system diagram of FIG. 1, electric power generated by generator 7 is supplied via an electric cable (or an electric wire harness) 9 to motor 4. As clearly shown in FIGS. 1-2, a junction box 10 is disposed in a middle of electric cable 9. Motor torque, which is output from the drive shaft of motor 4, flows through a reduction gear device 11 and a clutch 12 to a rear differential gear 13, and then flows via rear differential gear 13 to rear-left and rear-right road wheels 3L and 3R. An electric current sensor 23 is provided in junction box 10, for detecting or monitoring an electric current value Ia (i.e., an armature current of motor 4) of the electric power supplied from generator 7 to motor 4. The sensor signal from current sensor 23, indicative of armature current Ia, is output to 4WD controller 8. Additionally, 4WD controller 8 has a voltage detector that detects or monitors a motor voltage value of motor 4 (motor induced voltage E). A relay 24 is also provided to block or establish the electric power supply (the voltage supply and the current supply) from generator 7 to motor 4 in response to a control command from 4WD controller 8.

A field current Ifm of motor 4 is adjusted or controlled responsively to a motor control command from 4WD controller 8. That is, the motor torque (the driving torque) of motor 4 is adjusted or brought closer to a target motor torque Tm by adjusting motor field current Ifm.

A thermistor 25 is provided to detect or measure a motor temperature value of motor 4. A motor revolution sensor 26 is provided to detect or monitor a rotational speed of the drive shaft of motor 4, that is, motor speed Nm. The sensor signal from motor revolution sensor 26, indicative of motor speed Nm, is output to 4WD controller 8.

Also located at road wheels 1L, 1R, 3L, and 3R are four road wheel speed sensors 27FL, 27FR, 27RL, and 27RR. Wheel speed sensors 27FL, 27FR, 27RL, and 27RR are provided for detecting front-left, front-right, rear-left, and rear-right wheel speeds VwFL, VwFR, VwRL, and VwRR, which are collectively referred to as "Vw", and for generating four pulse signals, respectively indicating the respective wheel speeds VwFL, VwFR, VwRL, and VwRR, to 4WD controller 8.

Figure 3:
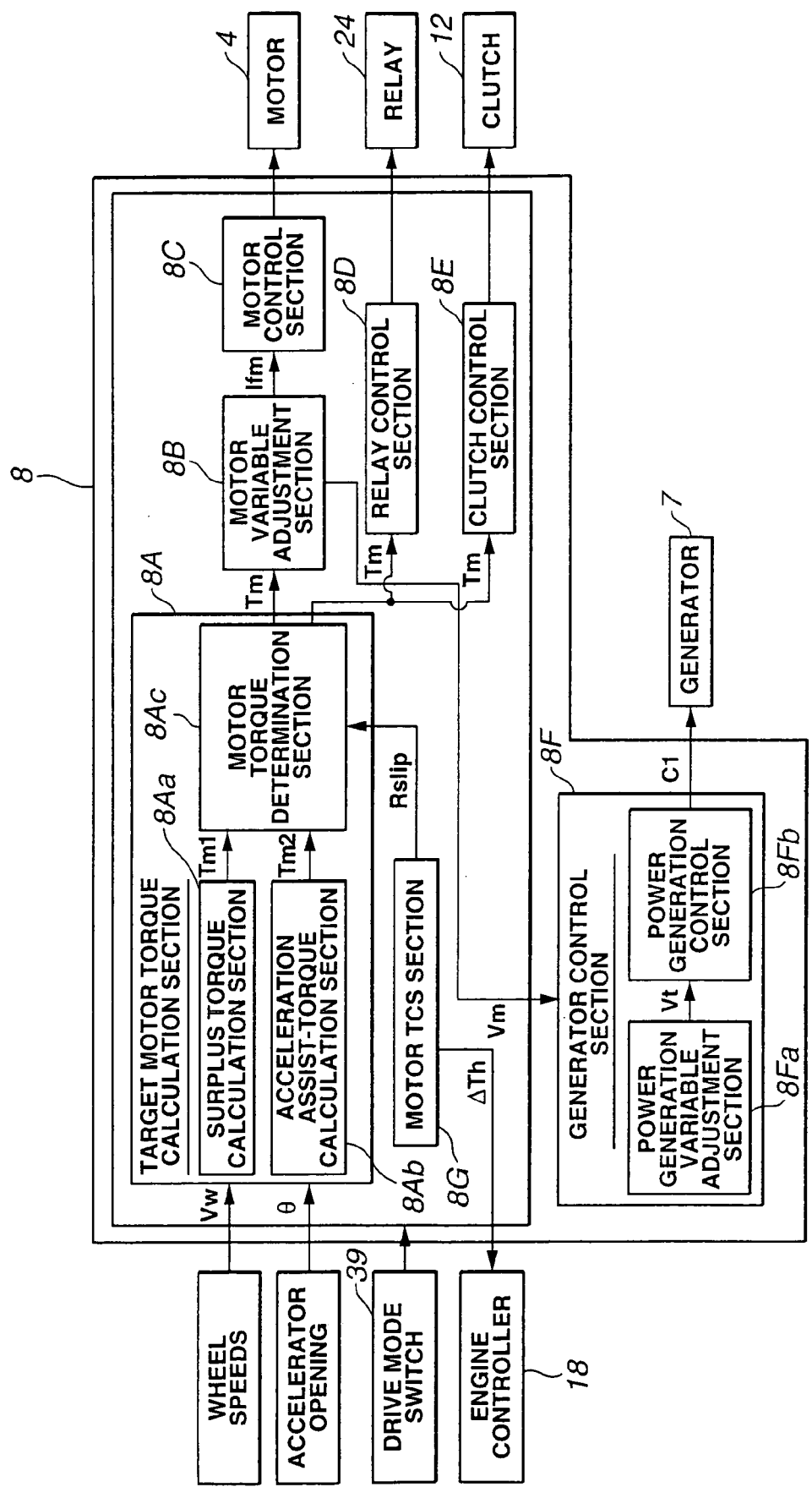
FIG. 3 is a block diagram of the 4WD controller of the vehicle driving force control apparatus of the embodiment.

Referring now to FIG. 3, there is shown the block diagram explaining the detailed structure of 4WD controller 8. As seen from the block diagram of FIG. 3, 4WD controller 8 is comprised of a target motor torque calculation section 8A, a motor variable adjustment section 8B (described later in reference to the flow chart of FIG. 6), a motor control section 8C, a relay control section 8D, a clutch control section 8E, a generator control section 8F, and a motor TCS section (a motor traction-control-system section) 8G (described later in reference to the flow chart of FIG. 7). 4WD controller 8 comes into operation, when the 4WD mode is selected by drive mode switch 39.

Relay control section 8D controls blocking and establishing operations of the electric power supply from generator 7 to motor 4. When the 4WD mode has been selected by drive mode switch 39 and therefore target motor torque Tm is greater than "0", that is, Tm>0, relay control section 8D controls relay 24 to keep relay 24 at its closed state (or an electric circuit connection state) where a pair of relay contacts are closed. Conversely when target motor torque Tm is equal to "0", that is, Tm=0, relay control section 8D controls relay 24 to keep relay 24 at its opened state (or an electric circuit disconnection state) where the pair of contacts are opened.

Clutch control section 8E controls engagement and disengagement of clutch 12. When the 4WD mode has been selected by drive mode switch 39 and therefore target motor torque Tm is greater than "0", that is, Tm>0, clutch control section 8E controls clutch 12 to keep clutch 12 at its engaged state. Conversely when target motor torque Tm is equal to "0", that is, Tm=0, clutch control section 8E controls clutch 12 to keep clutch 12 at its disengaged state. Target motor torque calculation section 8A includes a surplus torque calculation section 8Aa (hereunder described in detail in reference to the flow chart of FIG. 4), a vehicle acceleration assist-torque calculation section (simply, an acceleration assist-torque calculation section) 8Ab (hereunder described in detail in reference to the characteristics shown in FIGS. 5A-5B), and a motor torque determination section 8Ac.

Surplus torque calculation section 8Aa serves to calculate a surplus engine torque (simply, a surplus torque) Th corresponding to an acceleration slip rate of front road wheels (main drive wheels) 1L and 1R. Actually, surplus torque calculation section 8Aa executes the surplus torque Th arithmetic-calculation routine shown in FIG. 4. The surplus torque Th calculation routine of FIG. 4 is executed as time-triggered interrupt routines to be triggered every predetermined sampling time intervals such as 10 milliseconds.

Figure 4:
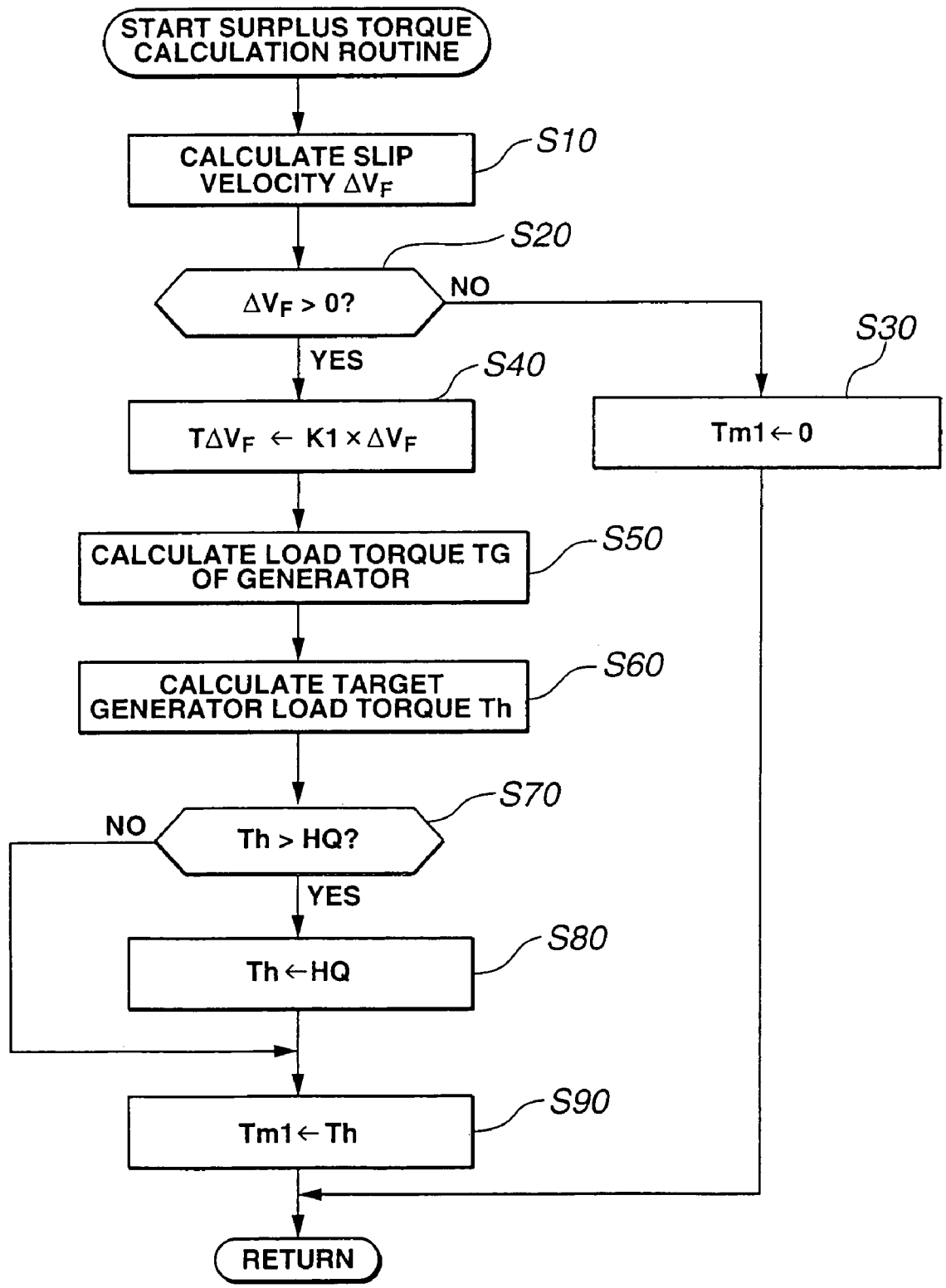
FIG. 4 is a flow chart showing a surplus torque Th arithmetic-calculation routine executed within a surplus torque calculation section of the 4WD controller.

At step S10 of FIG. 4, first, front-left, front-right, rear-left, and rear-right wheel speeds VwFL, VwFR, VwRL, and VwRR, detected by wheel speed sensors 27FL, 27FR, 27RL, and 27RR, are read. Then, on the basis of the latest up-to-date information about wheel speeds VwFL, VwFR, VwRL, and VwRR, an acceleration slip velocity (simply, a slip velocity) $\Delta VF$ corresponding to an acceleration slip rate of the front road wheel side (main drive wheels 1L, 1R) is calculated by subtracting a rear wheel speed VwR (i.e., a subsidiary drive wheel speed) from a front wheel speed VwF (i.e., a main drive wheel speed). More concretely, slip velocity $\Delta VF$ of the front road wheel side is calculated as follows.

An average front wheel speed Vwf of front-left and front-right wheel speeds VwFL and VwFR is calculated as a simple average (VwFL+VwFR)/2. At the same time, an average rear wheel speed Vwr of rear-left and rear-right wheel speeds VwRL and VwRR is calculated as a simple average (VwRL+VwRR)/2. Thereafter, slip velocity $\Delta VF$ corresponding to an acceleration slip rate of the front road wheel side (main drive wheels 1L, 1R) is calculated as a deviation (Vwf−Vwr) between average front wheel speed Vwf (=(VwFL+VwFR)/2) and average rear wheel speed Vwr (=(VwRL+VwRR)/2), that is, $\Delta VF$=(Vwf−Vwr). After step S10, step S20 occurs.

At step S20, a check is made to determine whether slip velocity $\Delta VF$, calculated at step S10, is greater than a predetermined value, in other words, a predetermined power-generation threshold value Tpg, such as "0". When the answer to step S20 is in the negative (NO), that is, in case of $\Delta VF \leq 0$, the processor (surplus torque calculation section 8Aa) of 4WD controller 8 determines or estimates that there is no acceleration slip at the front road wheel side (main drive wheels 1L. 1R), and thus the routine proceeds from step S20 to step S30. Conversely when the answer to step S20 is in the affirmative (YES), that is, in case of $\Delta VF > 0$, the processor (surplus torque calculation section 8Aa) of 4WD controller 8 determines or estimates that acceleration slip occurs at the front road wheel side (main drive wheels 1L. 1R), and thus the routine proceeds from step S20 to step S40. Step S20 of FIG. 4, step S610 of FIG. 8 (described later) and step S610 of FIG. 10 (described later), and wheel speed sensors 27FL-27RR serve as a main-drive-wheel acceleration slip estimation circuitry (or a main-drive-wheel acceleration slip detector or main-drive-wheel acceleration slip estimation means).

At step S30, zero is substituted for a first target motor torque Tm1, that is, Tm1=0 (or Tm1←0). Thereafter, the surplus torque Th calculation routine returns to the main program.

At step S40, an absorption torque $T\Delta VF$, needed to suppress acceleration slip of the front road wheel side (main drive wheels 1L, 1R), is arithmetically calculated from the expression $T\Delta VF = K1 \times \Delta VF$, where K1 denotes an experimentally-determined proportional gain. As can be appreciated from the above expression $T\Delta VF = K1 \times \Delta VF$, absorption torque $T\Delta VF$ is a variable that varies in direct proportion to slip velocity $\Delta VF$, that is, the acceleration slip rate of the front road wheel side (main drive wheels 1L, 1R). After step S40, step S50 occurs.

At step S50, a current load torque TG of generator 7 (or an actual generator load torque) is arithmetically calculated from the expression $TG = K2 \cdot (Vg \times Ia)/(K3 \times Nh)$, where Vg denotes an output voltage of generator 7, Ia denotes an armature current of motor 4, Nh denotes a generator speed, K3 denotes an efficiency of generator 7, and K2 denotes a coefficient. After step S50, step S60 occurs.

At step S60, the surplus engine torque Th, in other words, a target generator load torque Th is calculated as a sum (TG+T$\Delta VF$) of the current value of load torque TG of generator 7 calculated at step S50 and absorption torque T$\Delta VF$ (=K1×$\Delta VF$) calculated at step S40. After step S60, step S70 occurs.

At step S70, a check is made to determine whether target generator load torque (surplus engine torque) Th is greater than a generator's maximum load capacity HQ, which is determined by specifications of generator 7. When the answer to step S70 is negative (NO), that is, in case of Th$\leq$HQ, the routine jumps from step S70 to step S90. Conversely when the answer to step S70 is affirmative (YES), that is, in case of Th>HQ, the routine proceeds from step S70 to step S80.

At step S80, a limiter processing is made. That is, the upper limit of target generator load torque Th is limited to the previously-noted maximum load capacity HQ of generator 7. Thereafter, the routine flows from step S80 to step S90.

At step S90, the first target motor torque Tm1 corresponding to target generator load torque Th calculated at step S60 is calculated. That is to say, the calculated target generator load torque Th is substituted for the first target motor torque Tm1, that is, Tm1←Th. In this manner, one cycle of the surplus torque Th calculation routine of FIG. 4 terminates.

As can be appreciated from the flow from step S10 through steps S20, S40-S80 to step S90, the first target motor torque Tm1 can be set as a desired motor torque value substantially corresponding to the acceleration slip rate of the front road wheel side (main drive wheels 1L, 1R).

In the shown embodiment (in the surplus torque Th arithmetic-calculation routine shown in FIG. 4), the first target motor torque Tm1 is calculated after target generator load torque (surplus engine torque) Th has been calculated (see steps S40-S60 of FIG. 4). In lieu thereof, the first target motor torque Tm1 may be calculated, directly based on an acceleration slip rate of the front road wheel side (main drive wheels 1L, 1R), that is, front-road-wheel acceleration slip velocity $\Delta VF$, as a function $f(\Delta VF)$ of slip velocity $\Delta VF$.

Hereunder explained is the arithmetic processing of acceleration assist-torque calculation section 8Ab.

Figure 5A:
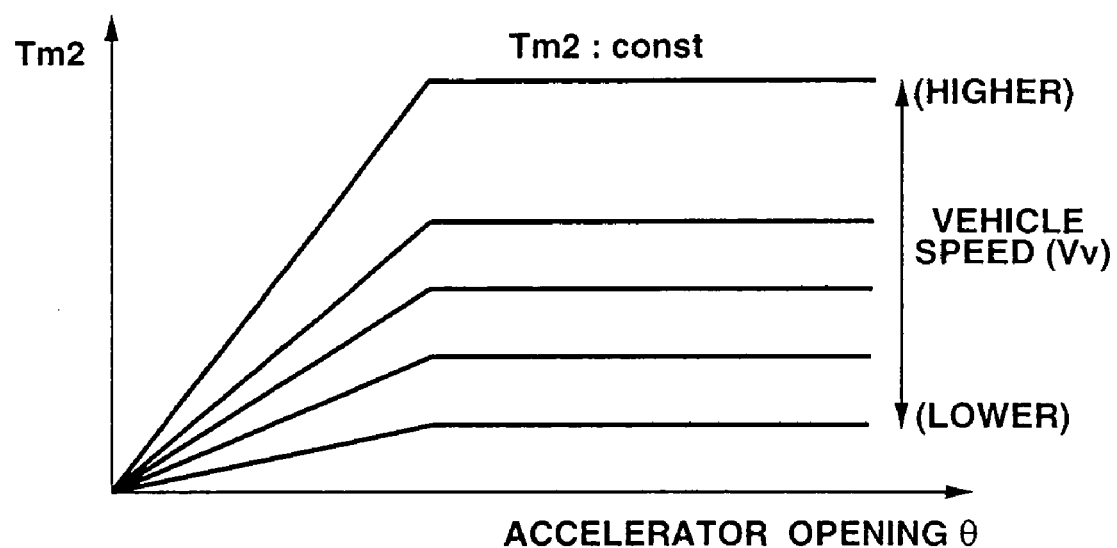
FIGS. 5A-5B respectively show an accelerator-opening θ versus second target motor torque Tm2 characteristic map and a vehicle speed Vv versus second target motor torque Tm2 characteristic map.
Figure 5B:
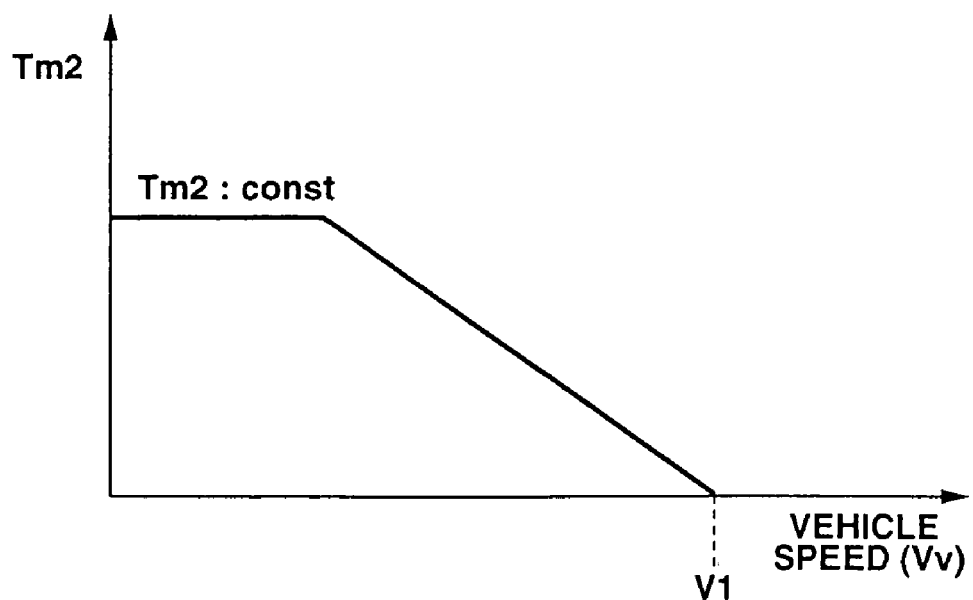

Acceleration assist-torque calculation section 8Ab arithmetically calculates or retrieves a second target motor torque Tm2, based on both of vehicle speed Vv and accelerator opening θ from a preprogrammed accelerator-opening θ versus second target motor torque Tm2 characteristic map shown in FIG. 5A and a preprogrammed vehicle speed Vv versus second target motor torque Tm2 characteristic map shown in FIG. 5B. Accelerator opening θ means a vehicle-acceleration indicated value. As can be seen from the accelerator-opening θ versus second target motor torque Tm2 characteristic map of FIG. 5A, the second target motor torque Tm2 increases, as accelerator opening θ increases, and additionally the second target motor torque Tm2 decreases, as vehicle speed Vv decreases. Also, as can be seen from the vehicle speed Vv versus second target motor torque Tm2 characteristic map shown in FIG. 5B, the second target motor torque Tm2 is set to "0", when vehicle speed Vv is greater than or equal to a predetermined vehicle speed value V1, corresponding to a predetermined low speed value above which the vehicle may be assumed to have escaped from the starting period.

As can be seen from the block diagram of FIG. 3, motor torque determination section 8Ac receives input information (Tm1) from surplus torque calculation section 8Aa and input information (Tm2) from acceleration assist-torque calculation section 8Ab. Within the motor torque determination section 8Ac, a so-called select-HIGH process is made to select a higher one of the first and second target motor torques Tm1 and Tm2 in accordance with the expression Tm=MAX(Tm1, Tm2), and to determine or set the higher one as a final target motor torque (simply, a target motor torque) Tm.

Additionally, motor torque determination section 8Ac is connected to motor TCS section (motor traction-control-system section) 8G, for receiving input information concerning a state of a rear-wheel acceleration-slip indicative flag (simply, a rear-wheel slip flag) Rslip from motor TCS section 8G. When rear-wheel slip flag Rslip is set to "1", that is, Rslip=1 (or Rslip is ON), and thus the processor (exactly, motor TCS section 8G) of 4WD controller 8 determines or estimates that acceleration slip takes place at the rear road wheel side (subsidiary drive wheels 3L, 3R), target motor torque Tm, obtained through the select-HIGH process Tm=MAX(Tm1, Tm2) of motor torque determination section 8Ac, is decreasingly compensated for or reduced by a reduced torque value $\Delta Tm$, that is, Tm=Tm−$\Delta Tm$. The reduced torque value $\Delta Tm$ means a reduced torque value of target motor torque Tm, corresponding to the acceleration slip rate of the rear road wheel side (subsidiary drive wheels 3L, 3R). Therefore, in case of Rslip=1, i.e., in case Rslip is ON, that is, in presence of acceleration slip at the rear road wheel side (subsidiary drive wheels 3L, 3R), the decreasingly-compensated target motor torque (Tm−$\Delta Tm$) is output from motor torque determination section 8Ac to motor variable adjustment section 8B. In contrast, when rear-wheel slip flag Rslip is reset to "0", that is, Rslip=0 (or Rslip is OFF), and thus the processor (exactly, motor TCS section 8G) of 4WD controller 8 determines or estimates that there is no acceleration slip at the rear road wheel side (subsidiary drive wheels 3L, 3R), target motor torque Tm, obtained through the select-HIGH process Tm=MAX(Tm1, Tm2) of motor torque determination section 8Ac, is output to motor variable adjustment section 8B. Motor TCS section 8G, motor torque determination section 8Ac, motor variable adjustment section 8B, and generator control section 8F, (in particular, motor TCS section 8G), capable of decreasingly compensating target motor torque Tm, in other words, electric power output of generator 7, in presence of acceleration slip at the subsidiary drive wheel side (rear road wheels 3L, 3R), construct an electric power output suppression circuitry (electric power output suppression means).

Figure 6:
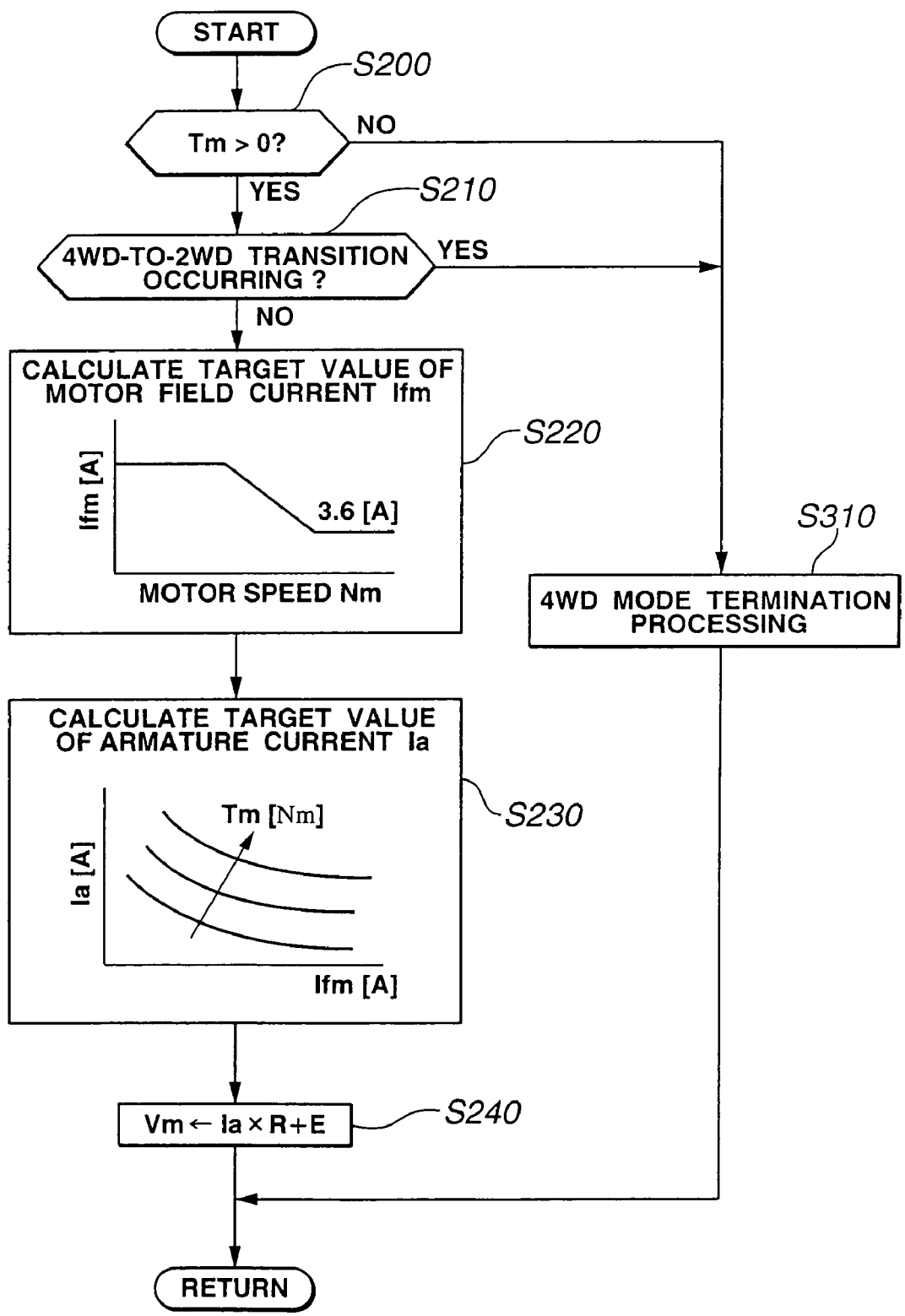
FIG. 6 is a flow chart illustrating an arithmetic and logic operation executed within a motor variable adjustment section of the 4WD controller.

The arithmetic and logic operation executed within motor variable adjustment section 8B is hereunder described in detail in reference to the flow chart of FIG. 6. The routine shown in FIG. 6 is also executed as time-triggered interrupt routines to be triggered every predetermined sampling time intervals such as 10 milliseconds.

At step S200, a check is made to determine whether target motor torque Tm is greater than "0". When the answer to step S200 is affirmative (Tm>0), the processor (motor variable adjustment section 8B) of 4WD controller 8 determines that there is a motor driving requirement for driving subsidiary drive wheels (rear road wheels 3L, 3R) by motor 4 and additionally the vehicle is conditioned in the 4WD mode at which acceleration slip may occur at main drive wheels (front road wheels 1L, 1R). In case of Tm>0, the routine proceeds from step S200 to step S210. Conversely when the answer to step S200 is negative (Tm≦0), the processor (motor variable adjustment section 8B) of 4WD controller 8 determines that there is no motor driving requirement for driving subsidiary drive wheels (rear road wheels 3L, 3R) by motor 4 and additionally the vehicle is not conditioned in the 4WD mode. Thus, in case of Tm≦0, the routine proceeds from step S200 to step S310.

At step S210, a check is made to determine whether a 4WD-to-2WD transition from the 4WD mode to the 2WD mode occurs. When the answer to step S210 is affirmative, that is, in presence of the 4WD-to-2WD transition, the routine proceeds from step S210 to step S310. Conversely when the answer to step S210 is negative, that is, in absence of the 4WD-to-2WD transition, in other words, when the 4WD mode is continuously selected, the routine proceeds from step S210 to step S220. For instance, when the processor of 4WD controller 8 determines that motor speed Nm is approaching closer to a permissible limit level, or when the selected operating range of transmission 30 is a non-drive range such as a parking (P) range or a neutral (N) range, the processor (motor variable adjustment section 8B) of 4WD controller 8 determines that there is a 4WD-to-2WD transition from the 4WD mode to the 2WD mode.

At step S310, the 4WD mode termination processing (including the power-generation stop processing (Vm=0)) is executed, and then the routine of FIG. 6 returns to the main program. Concretely, according to the 4WD mode termination processing of step S310, a power-generation stop signal is generated from motor variable adjustment section 8B to adjust or control a generated voltage Vm, needed to attain target motor torque Tm, to "0", that is, Vm=0.

At step S220, first, motor speed Nm, detected by motor revolution sensor 26, is read. Then, a target value of motor field current Ifm is calculated or retrieved, based on the latest up-to-date information about motor speed Nm, from a pre-programmed motor speed Nm versus target motor field current Ifm characteristic map shown in the block of step S220 shown in FIG. 6. After step S220, the routine advances to step S230. Motor variable adjustment section 8B outputs a signal indicative of the target motor field current, calculated through step S220, to motor control section 8C. Motor control section 8C feedback-controls to bring the actual motor field current Ifm closer to the target motor field current. In the shown embodiment, as can be seen from the predetermined Nm–Ifm characteristic map shown in the block of step S220 of FIG. 6, showing how the target motor field current has to be varied relative to motor speed Nm, when motor speed Nm is less than a predetermined motor speed Nm1, the target motor field current is fixed to a predetermined constant current value (or a high-level current value). In contrast, when motor speed Nm is greater than or equal to the predetermined motor speed Nm1, the target motor field current (i.e., motor field current Ifm) is gradually reduced in accordance with a conventional field weakening control. As is generally known, when motor 4 is rotating at high motor speeds, the motor torque tends to drop owing to a rise in motor induced voltage E. Thus, when motor speed Nm increases and becomes greater than or equal to the predetermined motor speed, the motor field current Ifm is decreasingly compensated for or gradually reduced in accordance with the conventional field weakening control such that motor induced voltage E is properly lowered, thus resulting in an increase in the current value of electric current supplied to motor 4, and consequently enabling motor 4 to produce a required motor torque. As a result of this, even if motor 4 is operating at high motor speeds, by way of the motor induced voltage rise suppressive control, it is possible to effectively suppress a drop in motor torque, and consequently to produce the required motor torque. As compared to a more complicated, continuous motor field current control method, the previously-noted two-step motor field current control method including the fixed Nm–Ifm characteristic (Nm<Nm1) and the motor-speed dependent variable Nm–Ifm characteristic (Nm≧Nm1) is superior in simplified electronic control circuit. Alternatively, in order to compute the target motor filed current and to produce the required motor torque, the comparatively complicated, continuous motor field current control method may be used, such that the motor torque can be continuously compensated for by adjusting motor field current Ifm based on motor speed Nm. By virtue of fine adjustment of the target motor filed current (i.e., the actual motor field current Ifm), it is possible to provide a more smooth motor torque characteristic. As compared to the two-step motor field current control method including the fixed Nm–Ifm characteristic (Nm<Nm1) and the motor-speed dependent variable Nm–Ifm characteristic (Nm≧Nm1), the complicated, continuous motor field current control method is superior in enhanced driving stability (enhanced vehicle driveability and enhanced vehicle stability) and improved motor driving efficiency, but inferior in reduced costs.

At step S230, a target value of armature current Ia of motor 4 is calculated or retrieved, based on the latest up-to-date information about the target value of motor field current Ifm and target motor torque Tm (see a preprogrammed Ifm–Tm–Ia characteristic map shown in the block of step S230 shown in FIG. 6). After step S230, step S240 occurs.

At step S240, generated voltage Vm, needed to attain target motor torque Tm, is arithmetically calculated based on the target value of armature current Ia, from the expression Vm=Ia×R+E, where E denotes the induced voltage of motor 4, and R denotes a value of resistance between generator 7 and motor 4. In this manner, one cycle of the routine of FIG. 6 terminates.

On the other hand, generator control section 8F is comprised of a power generation variable adjustment section 8Fa and a power generation control section 8Fb. Power generation variable adjustment section 8Fa substitutes the generated voltage Vm, needed to attain target motor torque Tm and determined by motor variable adjustment section 8B, for a target generated voltage Vt, that is, Vt←Vm, and additionally outputs a signal indicative of target generated voltage Vt to power generation control section 8Fb. Power generation control section 8Fb calculates or computes a target generator field current value (a target value of generator field current Ifh), needed to attain the target generated voltage Vt, on the basis of the latest up-to-date information about target generated voltage Vt and generator output voltage Vg. Thereafter, power generation control section 8Fb calculates or computes a generator control command (a given duty ratio) C1 corresponding to the computed target value of generator field current Ifh. The generator control command (the given duty ratio) C1 is output from power generation control section 8Fb of generator control section 8F to voltage regulator 22 of generator 7, and as a result generator output voltage Vg can be properly controlled or regulated.

Figure 7:
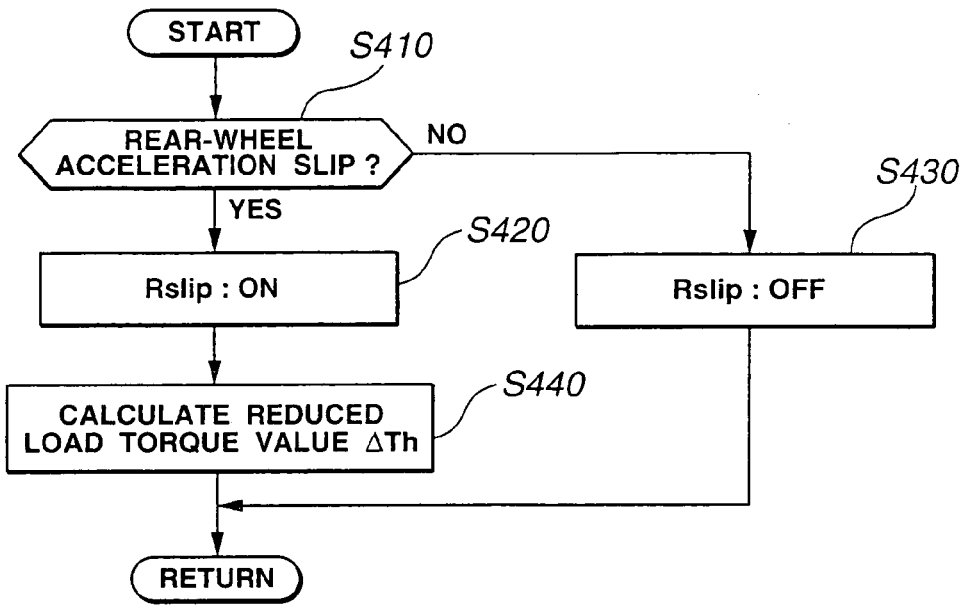
FIG. 7 is a flow chart illustrating an arithmetic and logic operation executed within a motor TCS section of the 4WD controller.

Referring now to FIG. 7, there is shown the arithmetic and logic operation executed within motor TCS section 8G of 4WD controller 8. The routine shown in FIG. 7 is also executed as time-triggered interrupt routines to be triggered every predetermined sampling time intervals such as 10 milliseconds.

At step S410, a check is made to determine whether acceleration slip greater than or equal to a predetermined slip rate, such as 0.01 G, occurs at the rear road wheel side (subsidiary drive wheels 3L, 3R). When the answer to step S410 is affirmative (YES), that is, when the acceleration slip rate of the rear road wheel side is greater than or equal to the predetermined slip rate, the routine proceeds from step S410 to step S420. Conversely when the answer to step S410 is negative (NO), that is, when the acceleration slip rate of the rear road wheel side is less than the predetermined slip rate, the routine proceeds from step S410 to step S430. Concretely, the acceleration slip rate of the rear road wheel side can be estimated or detected or calculated by way of acceleration of each of rear road wheels 3L and 3R or by subtracting a front wheel speed (i.e., a main drive wheel speed) from a rear wheel speed (i.e., a subsidiary drive wheel speed). When utilizing the acceleration of each of rear road wheels 3L and 3R for estimation purposes of the rear-wheel acceleration slip rate, an actual acceleration rate of each of rear road wheels 3L and 3R may be detected by means of a wheel acceleration sensor. In lieu thereof, the acceleration of each of rear road wheels 3L and 3R may be obtained by differentiating rear-left and rear-right wheel speeds VwRL and VwRR detected by rear road wheel speed sensors 27RL and 27RR. When the detected or calculated acceleration of the rear road wheel side is greater than or equal to a predetermined value, the processor (motor TCS section 8G) of 4WD controller 8 determines that acceleration slip of the predetermined slip rate or more takes place at the rear road wheel side (subsidiary drive wheels 3L, 3R). Alternatively, the difference (Vwr−Vwf) between the rear wheel speed (i.e., average rear wheel speed Vwr) and the front wheel speed (i.e., average front wheel speed Vwf) may be utilized for estimation purposes of the rear-wheel acceleration slip rate. In such a case, when the difference (ΔVR=Vwr−Vwf) between the rear wheel speed and the front wheel speed is greater than or equal to a predetermined value, the processor (motor TCS section 8G) of 4WD controller 8 determines that acceleration slip of the predetermined slip rate or more takes place at the rear road wheel side (subsidiary drive wheels 3L, 3R). In the shown embodiment, the acceleration slip velocity (or the acceleration slip rate) ΔVF of the front road wheel side and the acceleration slip velocity (or the acceleration slip rate) ΔVR of the rear road wheel side are collectively referred to as "ΔV".

At step S420, the rear-wheel acceleration-slip indicative flag (rear-wheel slip flag) Rslip is set to "1", that is, Rslip=1 (or Rslip is ON). After step S420, step S440 occurs.

At step S430, rear-wheel slip flag Rslip is reset to "0", that is, Rslip=0 (or Rslip is OFF), and then the routine of FIG. 7 returns to the main program.

At step S440, a reduced load torque value ΔTh of target generator load torque Th, corresponding to the reduced torque value ΔTm of target motor torque Tm, is arithmetically calculated, and therefore a signal indicative of the reduced load torque value ΔTh of target generator load torque Th is output from motor TCS section 8G to engine controller 18. In this manner, one execution cycle of the routine of FIG. 7 terminates. More concretely, the reduced load torque value ΔTh of target generator load torque Th is arithmetically calculated based on both of the reduced torque value ΔTm of target motor torque Tm) calculated based on the rear-wheel acceleration slip rate and a conversion value ΔNm converted from a wheel speed (exactly, a wheel-speed deviation) corresponding to the rear-wheel acceleration slip rate (e.g., a rear-wheel acceleration slip velocity ΔVR=Vwr−Vwf) into a motor speed of motor 4, from the following three expressions.

ΔP=ΔTm×ΔNm÷ηm×(2π/60)

ΔW=ΔP÷ηg

ΔTh=ΔW÷Nh÷(2π/60)

where ΔP denotes a reduced value of electric power output of generator 7, ΔTm denotes the reduced target motor torque value corresponding to the rear-wheel acceleration slip rate (e.g., ΔVR=Vwr−Vwf), in other words, the reduced torque value of target motor torque Tm to be subtracted in synchronism with switching to the operative state of motor TCS section 8G, ΔNm denotes the conversion value converted from the wheel speed corresponding to the rear-wheel acceleration slip rate (e.g., a rear-wheel acceleration slip velocity ΔVR=Vwr−Vwf) into the motor speed of motor 4, ηm denotes a motor efficiency (unit: %), ΔW denotes a reduced generated electric energy (or a reduced value of load torque for power generation of generator 7, simply a reduced power-generation load), ηg denotes a generator efficiency (unit: %), and Nh denotes the generator speed.

The previously-noted expressions for calculation of the reduced load torque value ΔTh of target generator load torque Th, are determined based on the reasons discussed below.

A generator's power output Δp(−) produced by generator 7 before motor TCS section 8G shifts to the operative state, is represented by the following expression. The generator's power output Δp(−) is referred to as "before-operation generator's power output Δp(−)".

Δp(−)=Tm_before×Nm_before÷ηm×(2π/60)

where Tm_before denotes a motor torque value of motor torque produced by motor 4 before motor TCS section 8G shifts to the operative state, Nm_before denotes a motor speed value of motor 4 before motor TCS section 8G shifts to the operative state, and ηm denotes the motor efficiency.

In a similar manner, a generator's power output Δp(+) produced by generator 7 after motor TCS section 8G has shifted to the operative state, is represented by the following expression. The generator's power output Δp(+) is referred to as "after-operation generator's power output Δp(+)".

Δp(+)=Tm_after×Nm_after÷ηm×(2π/60)

where Tm_after denotes a motor torque value of motor torque produced by motor 4 after motor TCS section 8G has shifted to the operative state, Nm_after denotes a motor speed value of motor 4 after motor TCS section 8G has shifted to the operative state, and ηm denotes the motor efficiency.

Therefore, a reduced power-generation load torque output Δp corresponding to the reduced target motor torque value ΔTm is represented by the following equations.

$$\begin{aligned}\Delta p &= \Delta p(-) - \Delta p(+)\\ &= \text{Tm\_before} \times \text{Nm\_before} \div \eta m \times (2\pi/60) -\\ &\quad \text{Tm\_after} \times \text{Nm\_after} \div \eta m \times (2\pi/60)\\ &= (\text{Tm\_before} - \text{Tm\_after}) \times (\text{Nm\_before} - \text{Nm\_after}) \div\\ &\quad \eta m \times (2\pi/60)\\ &= \Delta Tm \times (\text{Nm\_before} - \text{Nm\_after}) \div \eta m \times (2\pi/60)\end{aligned}$$

From the above equations, the reduced value ΔP of electric power output of generator 7 can be represented by the expression ΔP=ΔTm×ΔNm÷ηm×(2π/60). The difference (Nm_before−Nm_after) of before-operation motor speed value Nm_before and after-operation motor speed value Nm_after can be estimated or determined based on rear wheel speeds VwRL and VwRR. The reduced torque value (in other words, torque-down value) ΔTm of target motor torque Tm is determined as a variable substantially corresponding to the rear-wheel acceleration slip rate (e.g., ΔVR=Vwr−Vwf). In lieu thereof, the reduced target motor torque value ΔTm may be fixed to a predetermined constant. Motor TCS section 8G serves as a part of the electric power output suppression circuitry (the electric power output suppression means).

Figure 8:
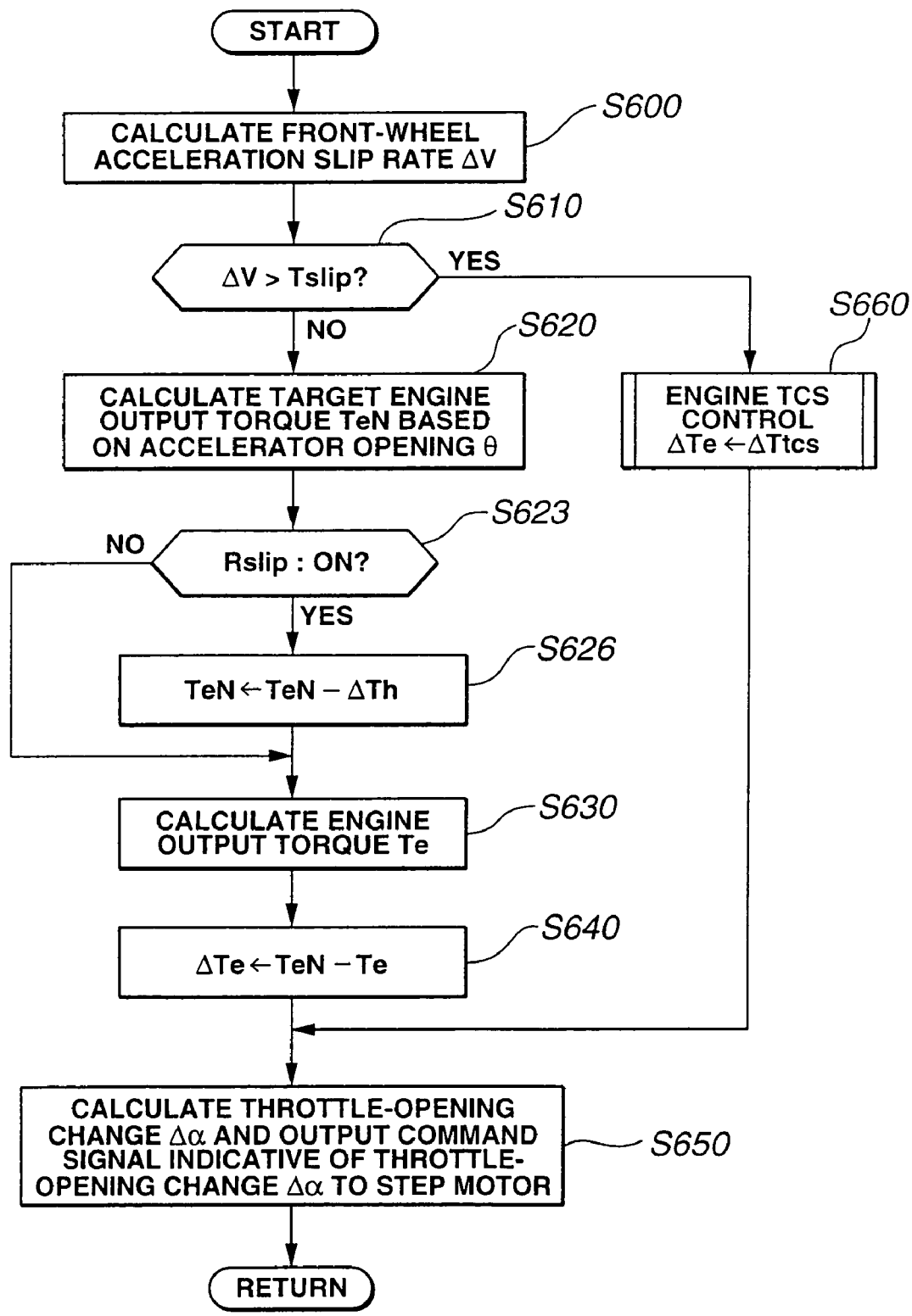
FIG. 8 is a flow chart illustrating an arithmetic and logic operation executed within an engine controller incorporated in the vehicle driving force control apparatus of the embodiment.

Referring now to FIG. 8, there is shown the arithmetic and logic operation executed within engine controller 18. The routine shown in FIG. 8 is also executed as time-triggered interrupt routines to be triggered every predetermined sampling time intervals such as 10 milliseconds.

At step S600, an acceleration slip rate ΔV of the front road wheel side (main drive wheels 1L, 1R) is calculated. The acceleration slip rate ΔV corresponds to the previously-noted acceleration slip velocity ΔVF of the front road wheel side (main drive wheels 1L, 1R). After step S600, step S610 occurs.

At step S610, a check is made to determine whether acceleration slip rate ΔV of the front road wheel side (main drive wheels 1L, 1R) exceeds a target front-wheel acceleration slip rate Tslip. When the answer to step S610 is affirmative (YES), that is, in case of ΔV>Tslip, the routine proceeds from step S610 to step S660. Conversely when the answer to step S610 is negative (NO), that is, in case of ΔV≦Tslip, the routine proceeds from step S610 to step S620. Target acceleration slip rate Tslip is preset to a predetermined slip rate, concretely, a relatively higher level, such as 10%, as compared to the previously-described predetermined power-generation threshold value Tpg (see step S20 of FIG. 4), such as "0".

Setting target acceleration slip rate Tslip to a relatively higher level, such as 10%, contributes to prevention of insufficient motor torque. In other words, target acceleration slip rate Tslip functions as a predetermined engine-TCS-control enabling threshold value or a predetermined engine TCS initiation threshold value or a predetermined engine TCS intervention threshold value above which an engine traction-control-system (simply, an engine TCS system) comes into operation so as to effectively suppress or reduce engine power output (engine output torque), and thus to suppress acceleration slip of the front road wheel (main drive wheels 1L, 1R).

At step S620, a driver-required target engine output torque TeN, indicative of a target engine output torque required by the driver, is determined based on the sensor signal from accelerator sensor 40, indicative of accelerator opening θ. After step S620, step S623 occurs.

At step S623, a check is made to determine whether rear-wheel slip flag Rslip is set to "1" (Rslip is ON). When rear-wheel slip flag Rslip is set (=1) and thus the answer to step S623 is affirmative (Rslip:ON), the routine proceeds from step S623 to step S626. Conversely when rear-wheel slip flag Rslip is reset (=0) and thus the answer to step S623 is negative (Rslip:OFF), the routine proceeds from step S623 to step S630.

At step S626, target engine output torque TeN, calculated through step S620, is decreasingly compensated or suppressed by the previously-noted reduced target generator load torque value ΔTh (calculated through step S440 of the routine shown in FIG. 7 executed within motor TCS section 8G), corresponding to the reduced torque value (torque-down value) ΔTm of target motor torque Tm, taking into account the rear-wheel acceleration slip. After step S626, step S630 occurs. Steps S623 and S626, provided for decreasingly compensating for target engine output torque TeN by the reduced load torque value ΔTh of target generator load torque Th in presence of acceleration slip at the subsidiary drive wheel side (rear road wheels 3L, 3R), constructs a target engine output torque reduction circuitry (target engine output torque reduction means). The target engine output torque reduction circuitry (target engine output torque reduction means) is regarded as a subsidiary-drive-wheel acceleration-slip period engine output torque reduction circuitry (subsidiary-drive-wheel acceleration-slip period engine output torque reduction means).

At step S630, the current value of engine output torque Te of engine 2 is calculated or determined based on at least one of the sub-throttle opening α of sub-throttle valve 16 and engine speed Ne. After step S630, step S640 occurs.

At step S640, a deviation ΔTe between the calculated target engine output torque TeN and the current engine output torque Te is arithmetically calculated from the expression ΔTe=TeN−Te. After step S640, step S650 occurs.

At step S650, a change Δα in sub-throttle opening α (exactly, repetition of an increase and a decrease in the sub-throttle opening), corresponding to engine-output-torque deviation ΔTe, is calculated or computed. A throttle-opening control command signal corresponding to the change Δα in sub-throttle opening α, is output to step motor 19 serving as a sub-throttle actuator. In explaining the embodiment, for the purpose of simplification of the disclosure, it is indicated that the throttle-opening control command signal corresponding to the sub-throttle opening change Δα is output to step motor 19. Actually, in order to smoothly change or reduce or suppress the engine output torque and to avoid undesirable rapid torque change, the sub-throttle opening is cyclically changed (incremented or decremented) by a predetermined increment or a predetermined decrement every predetermined execution cycles of the engine output control executed within engine controller 18.

In contrast, when the flow from step S610 to step S660 occurs, engine TCS control comes into operation. At step S660, for the purpose of suppression of acceleration slip of the front road wheel side (main road wheels 1L, 1R), a preprogrammed engine-TCS-control torque change ΔTtcs is substituted for engine-output-torque deviation ΔTe, that is, ΔTe=ΔTtcs (or ΔTe←ΔTtcs) in accordance with the engine TCS control. In the shown embodiment, preprogrammed engine-TCS-control torque change ΔTtcs is a variable, which is determined based on the front-wheel acceleration slip rate ΔVF. After step S660, step S650 occurs. Step S660, capable of initiating the engine TCS control and substituting engine-TCS-control torque change ΔTtcs for engine-output-torque deviation ΔTe under the condition of ΔVF>Tslip, constructs a main-drive-wheel acceleration-slip period engine output torque suppression circuitry (main-drive-wheel acceleration-slip period engine output torque suppression means).

With the previously-described arrangement, under a particular condition where the 4WD mode is selected via drive mode switch 39, the driving force control apparatus of the embodiment operates as follows.

Suppose that the magnitude of driving torque transmitted from engine 2 to the main drive wheel side (front road wheels 1L, 1R) is exceeding a grip limit (or a road-surface reaction limit) of the main drive wheel on the road owing to the low-μ road driving, or suppose that accelerator pedal 17 is heavily depressed by the driver. Acceleration slip may take place at the main drive wheel side (front road wheels 1L, 1R), that is, ΔVF>0. Under these conditions where the condition defined by the inequality ΔVF>0 is satisfied and the 4WD mode is selected by drive mode switch 39, relay 24 becomes kept at its closed state where a pair of relay contacts are closed by means of relay control section 8D. Additionally, clutch 12 becomes kept at its engaged state by means of clutch control section 8E. Generator 7 performs generating operation based on the generator's power-generation load (exactly, target generator load torque Th, in other words, the first target motor torque Tm1) corresponding to the front-wheel acceleration slip rate ΔV (=ΔVF) and thus motor 4 is driven, so that shifting to the vehicle's 4WD mode is completed (see the flow from step S20 through steps S50, S60, and S70 to step S90 of FIG. 4). At this time, motor 4 is rotated by way of the surplus electric power generated by generator 7 such that subsidiary drive wheels (rear road wheels 3L, 3R) are driven by means of motor torque, thereby enhancing the vehicle's acceleration performance. Additionally, motor 4 is driven by way of the surplus driving torque exceeding the grip limit (or the road-surface reaction limit) of the main drive wheel 1L, 1R on the road, thereby enhancing the energy efficiency and ensuring reduced fuel consumption rate of the vehicle. After this, the magnitude of driving torque transmitted from engine 2 to the main drive wheel side (front road wheels 1L, 1R) is adjusted or converged or brought closer to the grip limit (or the road-surface reaction limit) of the main drive wheel on the road. Therefore, the operating state of the vehicle is gradually shifted from the 4WD mode to the 2WD mode, and whereby the main-drive-wheel acceleration slip can be effectively suppressed.

During the vehicle's starting period, an acceleration slip of the main drive wheel side (front road wheels 1L, 1R) does not develop sufficiently, and thus there is a less front-wheel acceleration slip rate. Under such a condition (Tm2>Tm1), motor 4 is driven so that motor torque is brought closer to the second target motor torque Tm2 determined based on at least accelerator opening θ. This enhances the vehicle's acceleration performance during the starting period.

Thereafter, suppose that a front-wheel acceleration slip of an acceleration slip rate greater than the predetermined engine-TCS-control enabling threshold value Tslip, which is set to be relatively higher than the predetermined power-generation threshold value Tpg, takes place, that is, ΔVF>Tslip. The routine of FIG. 8 flows from step S610 to step S660 irrespective of whether accelerator pedal 17 is depressed or undepressed by the driver, exactly, regardless of the manipulated variable of accelerator pedal 17 depressed by the driver, and whereby the engine power output is effectively automatically forcibly suppressed by way of engine TCS control. As a result of this, the main-drive-wheel acceleration slip of front road wheels 1L, 1R can be effectively suppressed or converged.

As appreciated from the vehicle speed Vv versus second target motor torque Tm2 characteristic map shown in FIG. 5B, when vehicle speed Vv is greater than or equal to the predetermined vehicle speed value V1 above which the vehicle may be assumed to have escaped from the starting period, the second target motor torque Tm2 is set to "0". Under the conditions of Vv≧V1 and ΔVF>0, by way of the select-HIGH process Tm=MAX(Tm1, Tm2) of motor torque determination section 8Ac, the first target motor torque Tm1 is selected as target motor torque Tm. Therefore, generator 7 is driven in such a manner as to attain the generator's power-generation load corresponding to the front-wheel acceleration slip rate ΔV (=ΔVF), in other words, absorption torque TΔVF needed to suppress the front-wheel acceleration slip, and thus the engine output torque transmitted from engine 2 to the main drive wheel side (front road wheels 1L, 1R) can be properly reduced or absorbed, thereby effectively suppressing the main-drive-wheel acceleration slip. Additionally, under the condition of ΔVF>Tslip, the engine TCS control comes into operation at once (see the flow from step S610 to step S660 in FIG. 8), so that the engine power output itself can be quickly timely suppressed, so as to rapidly suppress acceleration slip of the main drive wheel side (front road wheels 1L, 1R).

On the contrary, suppose that motor 4 is driven by electric power output of generator 7 to ensure the 4WD mode of the vehicle, and additionally an acceleration slip greater than or equal to the predetermined slip rate occurs at the rear road wheel side (subsidiary drive wheels 3L, 3R) owing to the low-μ road driving.

In a conventional manner, assuming that the electric power output of generator 7 is simply reduced without deliberation for subsidiary-drive-wheel acceleration slip suppression of rear road wheels 3L, 3R, the power-generation load, in other words, the generator load torque, is lightened by the reduced value of electric power output of generator 7, thereby resulting in an undesirable increase in driving torque flow to front road wheels 1L, 1R. An acceleration slip of the main drive wheel side (front road wheels 1L, 1R) starts to develop, thus resulting in an undesirable engine speed rise. As a consequence, the power-generation load may be increased again, and therefore acceleration slip of the subsidiary drive wheel side (rear wheels 3L, 3R) may occur again. That is, there is an increased tendency for undesirable control hunting between subsidiary-drive-wheel acceleration-slip suppression control and main-drive-wheel acceleration-slip suppression control to occur.

In contrast to the above, according to the driving force control apparatus of the embodiment shown in FIGS. 7-8, in order to suppress the acceleration slip of the subsidiary drive wheel side (rear road wheels 3L, 3R), the engine power output (exactly, target engine output torque TeN) can be decreasingly compensated for or reduced down to the value TeN−ΔTh (see the flow from step S623 to step S626) responsively to or in synchronism with a decrease in power-generation load, exactly, a reduction ΔTh in target generator load torque Th (see the flow from S410 through step S420 to step S440 in FIG. 7). For the reasons discussed above, even if the electric power output of generator 7 is rapidly reduced for subsidiary-drive-wheel acceleration slip suppression of rear road wheels 3L, 3R, it is possible to prevent or avoid an excessive rise in engine speed Ne, thereby effectively suppressing or preventing a main-drive-wheel acceleration slip from starting to develop. Suppressing the engine power output (exactly, target engine output torque TeN) synchronously with a decrease in power-generation load (exactly, a reduction ΔTh in target generator load torque Th), made for subsidiary-drive-wheel acceleration slip suppression, means that an undesirable increase in main-drive-wheel acceleration slip can be suppressed beforehand in a similar manner to feedforward control. During the subsidiary-drive-wheel acceleration-slip suppression control, the driving force control apparatus of the embodiment, never performs such engine output torque suppression as to be executed by the engine TCS system (see step S660) under the condition of ΔVF>Tslip. That is to say, during the subsidiary-drive-wheel acceleration-slip suppression control, the driving force control apparatus of the embodiment, does not operate to suppress the engine output torque after engine traction-control-system (TCS) intervention threshold value Tslip has been reached, but quickly performs the feedforward-control like engine torque output suppression, while foreseeing or anticipating the acceleration-slip increase of the main drive wheel side (front road wheels 1L, 1R) in advance.

Figure 9A:
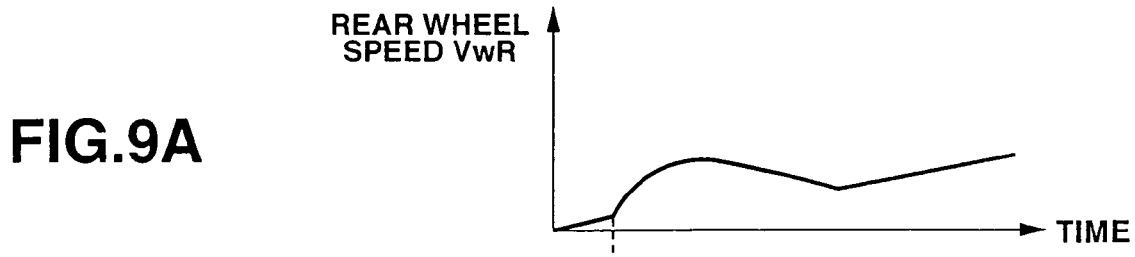
FIGS. 9A-9E are time charts explaining the operation of the vehicle driving force control apparatus employing the motor TCS section executing the routine of FIG. 7 and the engine controller executing the routine of FIG. 8.
Figure 9B:
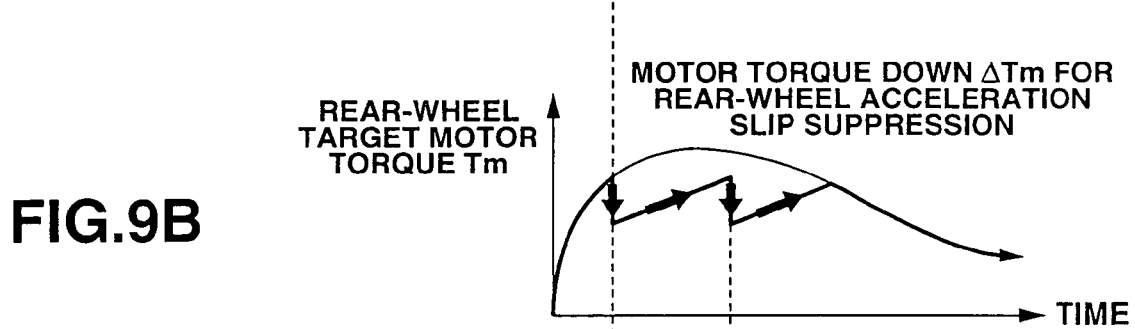
Figure 9C:
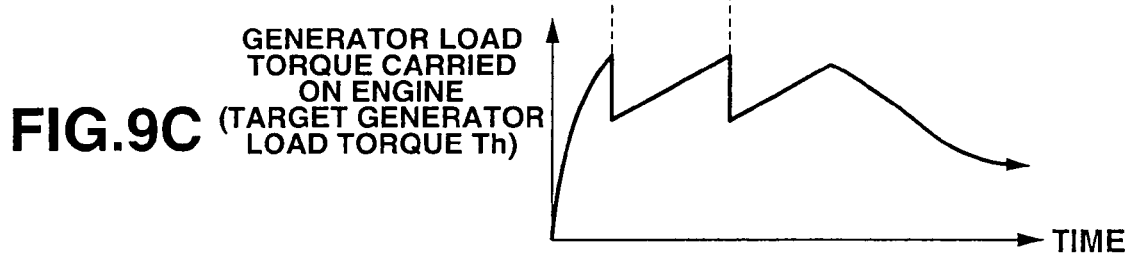
Figure 9D:
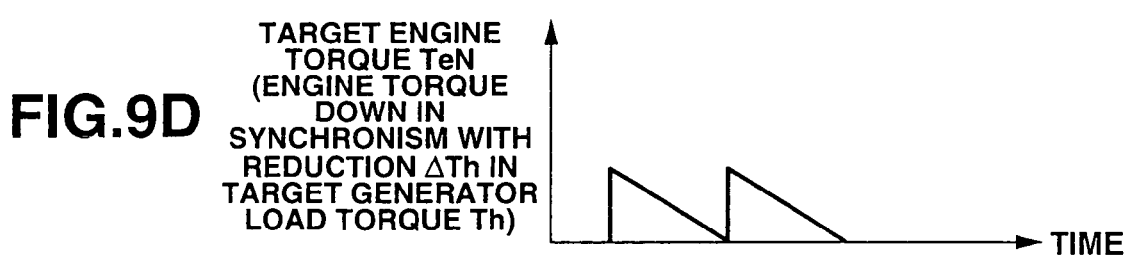
Figure 9E:
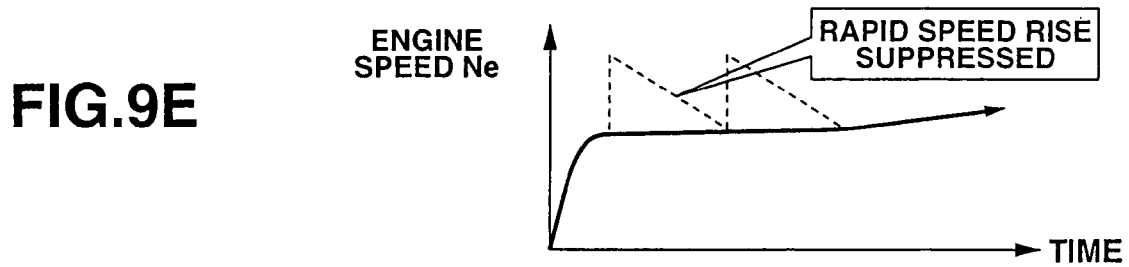

Referring now to FIGS. 9A-9E, there are shown the time charts explaining the operation of the vehicle driving force control apparatus employing motor TCS section 8G of 4WD controller 8 executing the routine of FIG. 7 and engine controller 18 executing the routine of FIG. 8. FIG. 9A shows variations in rear wheel speed VwR. FIG. 9B shows variations in the motor-torque command (corresponding to target motor torque Tm) for motor 4 by which the subsidiary drive wheels (rear road wheels 3L, 3R) are driven. FIG. 9C shows variations in generator load torque carried on engine 2, exactly, variations in target generator load torque Th. FIG. 9D shows variations in engine output torque, exactly target engine output torque TeN. FIG. 9E shows variations in engine speed Ne. As can be seen from the time charts of FIGS. 9A-9E, when acceleration slip occur at the subsidiary drive wheels (rear road wheels 3L, 3R), target motor torque Tm is reduced by the reduced torque value ΔTm determined based on the rear-wheel acceleration slip rate (e.g., ΔVR=Vwr−Vwf). At the same time, as shown in FIG. 9C, target generator load torque value Th is reduced by the reduced target generator load torque value ΔTh corresponding to the reduced target motor torque value ΔTm. As shown in FIG. 9D, the engine power output (exactly, target engine output torque TeN) is decreasingly compensated for or reduced or suppressed in synchronism with the reduction ΔTh in target generator load torque Th. As can be seen from the time chart of FIG. 9E, it is possible to avoid or suppress an undesirable rise in engine speed by reducing target engine output torque TeN in synchronism with the target generator load torque reduction ΔTh.

As previously described, according to the driving force control apparatus of the embodiment, generator 7 is operated based on the power-generation load corresponding to the front-wheel acceleration slip rate ΔV (=ΔVF), so that motor 4 drives the subsidiary drive wheels (rear road wheels 3L, 3R)

depending on the front-wheel acceleration slip rate $\Delta V$ (=$\Delta VF$). That is, the apparatus of the embodiment is so constructed or designed that, as a result of the enhanced vehicle acceleration performance, the acceleration slip of the main drive wheels (front road wheels 1L, 1R) can be properly suppressed. For the reasons discussed above, target front-wheel acceleration slip rate (predetermined engine TCS intervention threshold value) Tslip (e.g., 10%) is preset to be relatively higher than predetermined power-generation threshold value Tpg (e.g., "0"). In other words, only in case that, in order to suppress the front-wheel acceleration slip, part of engine torque flow to front road wheels 1L, 1R has been utilized for power generation and thereafter the front-wheel acceleration slip cannot yet be adequately suppressed or converged, the engine TCS function is engaged or enabled. Setting of target front-wheel acceleration slip rate (engine TCS intervention threshold value) Tslip (e.g., 10%) relatively higher than predetermined power-generation threshold value Tpg (e.g., "0"), prevents the engine TCS function from being undesirably engaged at an acceleration-slip point where a front-wheel acceleration slip would start to develop or at an excessively earlier timing of front-wheel acceleration slip occurrence. Inhibiting or disengaging the engine TCS function at the excessively earlier timing of front-wheel acceleration slip occurrence, prevents or avoids a lack of motor torque produced by motor 4, in other words, insufficient power generation of generator 7.

In the shown embodiment, target motor torque Tm is decreasingly compensated for or reduced by the reduced torque value $\Delta Tm$ corresponding to the rear-wheel acceleration slip rate (e.g., $\Delta VR=Vwr-Vwf$), depending on whether an acceleration slip of the subsidiary drive wheel (rear road wheels 3L, 3R) is greater than or equal to the predetermined slip rate, that is, depending on the state (Rslip:ON or Rslip:OFF) of rear-wheel slip flag Rslip. The reduced load torque value $\Delta Th$ of target generator load torque Th is calculated based on the reduced torque value $\Delta Tm$ of target motor torque Tm, through step S440 of FIG. 7. On the other hand, target generator load torque Th itself is calculated by the surplus torque Th arithmetic-calculation routine shown in FIG. 4, separately from the routine of FIG. 7 for calculation of the reduced torque value $\Delta Tm$. Instead of using the reduced torque value $\Delta Tm$ of target motor torque Tm, the reduced load torque value $\Delta Th$ of generator 7 may be calculated as a function f(Vv) of vehicle speed Vv. In lieu thereof, the reduced load torque value $\Delta Th$ of generator 7 may be preset as a predetermined fixed value. Alternatively, in the surplus torque Th arithmetic-calculation routine shown in FIG. 4, through which the first target motor torque Tm1 can be calculated taking into account the rear-wheel acceleration slip rate (e.g., $\Delta VR=Vwr-Vwf$), in presence of the rear-wheel acceleration slip (i.e., Rslip:ON), the surplus engine torque (target generator load torque Th) may be decreasingly compensated for or reduced by the reduced load torque value $\Delta Th$ just before step S90 of the routine of FIG. 4, executed within surplus torque calculation section 8Aa of 4WD controller 8.

Figure 10:
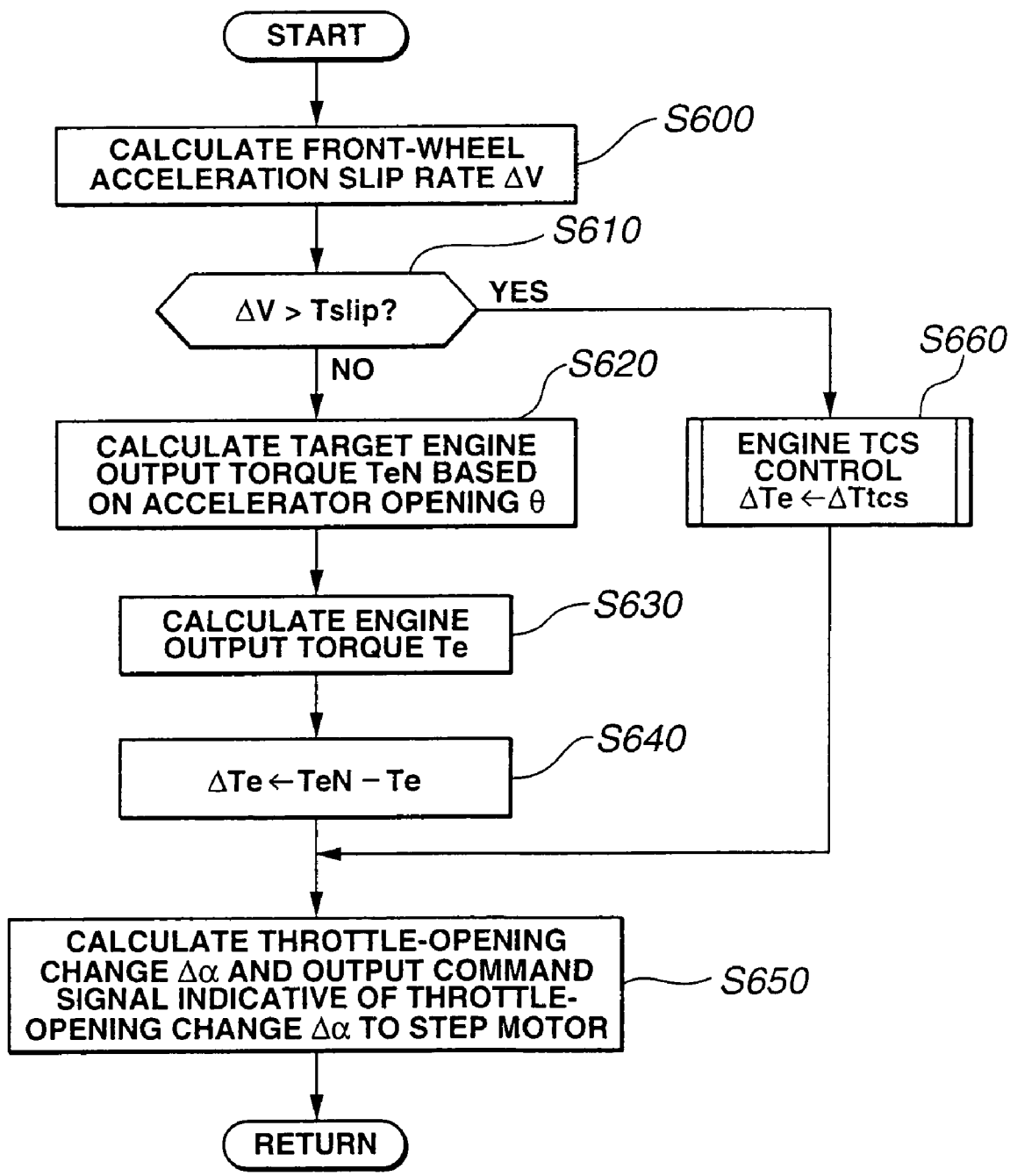
FIG. 10 is a flow chart illustrating a modified arithmetic and logic operation executed within the engine controller.

Referring now to FIG. 10, there is shown the modified arithmetic and logic operation executed within engine controller 18. The modified arithmetic and logic processing of FIG. 10 is similar to the processing of FIG. 8, except that steps S623 and S626 included in the routine shown in FIG. 8 are eliminated. Thus, the same step numbers used to designate steps in the routine shown in FIG. 8 will be applied to the corresponding step numbers used in the modified arithmetic and logic processing shown in FIG. 10, for the purpose of comparison of the two different interrupt routines. Detailed description of steps S600, S610, S620, S630, S640, S650, and S660 shown in FIG. 10 will be omitted because the above description thereon seems to be self-explanatory.

Figure 11:
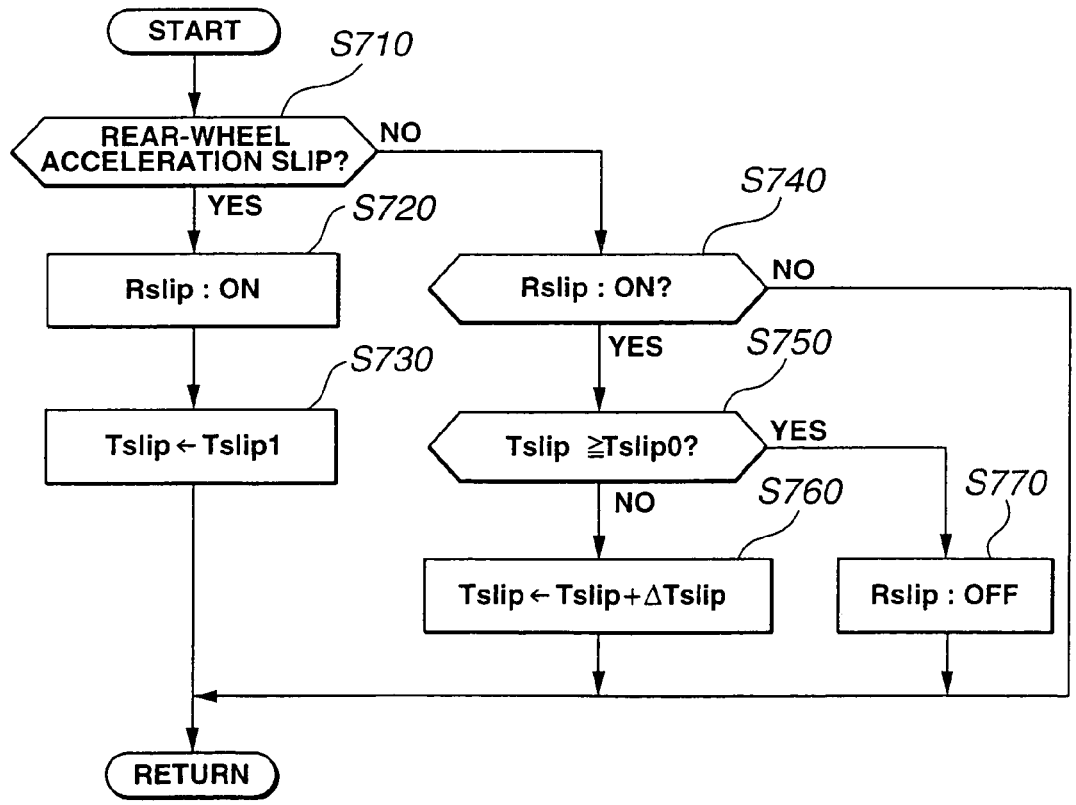
FIG. 11 is a flow chart illustrating a modified arithmetic and logic operation executed within the motor TCS section of the 4WD controller.

Referring now to FIG. 11, there is shown the modified arithmetic and logic operation executed within motor TCS section 8G of 4WD controller 8.

The countermeasure for a main-drive-wheel acceleration slip which may occur due to the target generator load torque reduction executed in presence of a subsidiary-drive-wheel acceleration slip, achieved by the modified vehicle driving force control apparatus employing engine controller 18 executing the routine of FIG. 10 and motor TCS section 8G executing the routine of FIG. 11, is somewhat different from that of the vehicle driving force control apparatus of the embodiment employing engine controller 18 executing the routine of FIG. 8 and motor TCS section 8G executing the routine of FIG. 7. In particular, the processing (see FIG. 11) executed within motor TCS section 8G of 4WD controller incorporated in the modified vehicle driving force control apparatus shown in FIGS. 10-11 considerably differs from the processing (see FIG. 7) executed within motor TCS section 8G of 4WD controller incorporated in the vehicle driving force control apparatus of the embodiment shown in FIGS. 7-8. Details of the modified arithmetic and logic operation executed within motor TCS section 8G are hereunder described in reference to the flow chart of FIG. 11.

At step S710 of FIG. 11, in a similar manner to step S410 of FIG. 7, a check is made to determine whether a rear-wheel acceleration slip rate is greater than or equal to a predetermined slip rate. When the answer to step S710 is affirmative (YES), that is, when the rear-wheel acceleration slip rate is greater than or equal to the predetermined slip rate, the routine proceeds from step S710 to step S720. Conversely when the answer to step S710 is negative (NO), that is, when the rear-wheel acceleration slip rate is less than the predetermined slip rate, the routine proceeds from step S710 to step S740. Step S710 of FIG. 11 and step S410 of FIG. 7, and wheel speed sensors 27FL-27RR serve as a subsidiary-drive-wheel acceleration slip estimation circuitry (a subsidiary-drive-wheel acceleration slip detector or subsidiary-drive-wheel acceleration slip estimation means).

At step S720, rear-wheel slip flag Rslip is set to "1", that is, Rslip=1 (or Rslip is ON). After step S720, step S730 occurs.

At step S730, target front-wheel acceleration slip rate (engine TCS intervention threshold value) Tslip, which is used as a decision criterion for determining the presence or absence of a main-drive-wheel acceleration slip of front road wheels 1L, 1R, and for determining the starting point of engine TCS control, is altered to a predetermined low threshold value Tslip1 lower than an initial threshold value Tslip0.

At step S740, a check is made to determine whether rear-wheel slip flag Rslip is set to "1", that is, Rslip=1 (or Rslip is ON). When the answer to step S740 is affirmative (Rslip:ON), the routine proceeds from step S740 to step S750. Conversely when the answer to step S740 is negative (Rslip:OFF), the routine returns' to the main program. At the starting point of the interrupt routine of FIG. 11, rear-wheel slip flag Rslip is initialized to "OFF", in other words, Rslip=0.

At step S750, a check is made to determine whether the current value of engine TCS intervention threshold value Tslip is greater than or equal to the initial threshold value Tslip0. When the answer to step S750 is negative (Tslip<Tslip0), the routine proceeds from step S750 to step S760. Conversely when the answer to step S750 is affirmative (Tslip$\geq$Tslip0), the routine proceeds from step S750 to step S770.

At step S760, engine TCS intervention threshold value Tslip is incremented by a predetermined increment $\Delta$Tslip.

At step S770, rear-wheel slip flag Rslip is reset to "0", that is, Rslip=0 (or Rslip is OFF). By way of repeated executions of a series of steps S740, S750, S760, and S770, engine TCS intervention threshold value Tslip does not rapidly return to the initial threshold value Tslip0, but gradually increases and approaches to the initial threshold value Tslip0 by the predetermined increment ΔTslip every execution cycles. Motor TCS section 8G (in particular, steps S720-S730 of the routine shown in FIG. 11), serves as an acceleration slip threshold value alteration circuitry (acceleration slip threshold value alteration means). The acceleration slip threshold value alteration circuitry (acceleration slip threshold value alteration means) is also regarded as the subsidiary-drive-wheel acceleration-slip period engine output torque reduction circuitry (subsidiary-drive-wheel acceleration-slip period engine output torque reduction means).

According to the modified driving force control apparatus shown in FIGS. 10-11, when a rear-wheel acceleration slip occurs, power-generation load (target generator load torque Th) is decreasingly compensated for or reduced depending on the degree of the rear-wheel slip rate. At the same time, target front-wheel acceleration slip rate (engine TCS intervention threshold value) Tslip, which is used as a criterion for determining the starting point of engine TCS control, is rapidly altered down to a low level (Tslip1), with the result that the engine TCS system comes into operation at an earlier timing of rear-wheel acceleration slip occurrence. As a result, as soon as the power-generation load, in other words, the generator load torque, is lightened in order to suppress the rear-wheel acceleration slip, a front-wheel acceleration slip rate, on the one hand, tends to increase owing to an increase in engine speed Ne, but the engine TCS function, on the other hand, is able to be quickly engaged at the earlier timing of rear-wheel acceleration slip occurrence, thus effectively timely suppressing the engine power output. As a consequence, even when the rear-wheel acceleration slip occurs, it is possible to effectively optimally converge or suppress the front-wheel acceleration slip as well as the rear-wheel acceleration slip. Additionally, from the point of time when the rear-wheel acceleration slip has been satisfactorily suppressed and converged, target front-wheel acceleration slip rate (engine TCS intervention threshold value) Tslip is not rapidly returned or recovered to the initial threshold value Tslip0, but gradually stepped up to the initial threshold value Tslip0 by predetermined increment ΔTslip every execution cycles. Gradually stepping up the threshold value) Tslip avoids a rear-wheel acceleration slip from occurring again owing to a rapid increase in engine power output, thereby effectively avoiding or suppressing a risk of undesirable control hunting between subsidiary-drive-wheel acceleration-slip suppression control and main-drive-wheel acceleration-slip suppression control.

Referring now to FIGS. 12A-12F, there are shown the time charts explaining the operation of the modified vehicle driving force control apparatus employing motor TCS section 8G of 4WD controller 8 executing the routine of FIG. 11 and engine controller 18 executing the routine of FIG. 10. FIG. 12A shows variations in rear wheel speed VwR. FIG. 12B shows variations in the motor-torque command (corresponding to target motor torque Tm) for motor 4 by which the subsidiary drive wheels (rear road wheels 3L, 3R) are driven. FIG. 12C shows variations in rear-wheel slip flag Rslip. FIG. 12D shows alteration of target front-wheel acceleration slip rate (engine TCS intervention threshold value) Tslip. FIG. 12E shows variations in each of front-wheel speed VwF and rear-wheel speed VwR. FIG. 12F shows variations in engine speed Ne. As can be seen from the time charts of FIGS. 12A-12F, when the rear-acceleration slip rate exceeds the predetermined slip rate, target motor torque Tm is reduced by the reduced torque value ΔTm determined based on the rear-wheel acceleration slip rate (e.g., ΔVR=Vwr−Vwf). At the time t1, rear-wheel slip flag Rslip becomes ON, that is, Rslip=1 (see FIG. 12C). As shown in FIG. 12D, the target front-wheel acceleration slip rate (engine TCS intervention threshold value) Tslip is rapidly altered down to a low level Tslip1 in synchronism with the reduction ΔTm in target motor torque for motor 4, in other words, the reduction in power-generation load of generator 7. Due to alteration of engine TCS intervention threshold value Tslip down to the low level Tslip1 (lower than the initial threshold value Tslip0), immediately when the power-generation load is lightened to suppress the rear-wheel acceleration slip, a front-wheel acceleration slip rate, on the one hand, tends to increase owing to the engine-speed increase, but the engine TCS system, on the other hand, quickly comes into operation at the earlier timing of rear-wheel acceleration slip occurrence. As a result of this, it is possible to properly timely suppress the engine power output, thus effectively suppressing the front-wheel acceleration slip (see the moderate change in front wheel speed VwF of FIG. 12E) as well as the rear-wheel acceleration slip (see the moderate change in rear wheel speed VwR of FIG. 12E). As can be appreciated from the time period (t2-t2) of the time chart of FIG. 12F, it is possible to avoid or suppress an undesirable engine speed rise by altering engine TCS intervention threshold value Tslip down to the low level Tslip1 (<Tslip0) in synchronism with the power-generation load reduction. Additionally, as can be appreciated from the wheel-speed change (VwF, VwR) after the time t2 of the time chart of FIG. 12F, it is possible to avoid or suppress an undesirable engine speed rise by gradually increasing or recovering engine TCS intervention threshold value Tslip from the predetermined low threshold value Tslip1 to the initial threshold value Tslip0 even after the rear-wheel acceleration slip has been converged and suppressed.

Suppose that engine TCS intervention threshold value Tslip is maintained at the predetermined low threshold value Tslip1 for a comparatively long time period. In such a case, the engine TCS system may be engaged always at an earlier timing of rear-wheel acceleration slip occurrence, and whereby engine power output is forcibly reduced by engine TCS control for front-wheel acceleration slip suppression. This leads to the problem of insufficient power generation of generator 7, that is, an undesirably reduced motor torque. For the reasons discussed above, preferably, the time period (t2-t1), during which engine TCS intervention threshold value Tslip is held at the predetermined low threshold value Tslip1 (<Tslip0), has to be set to a short time period.

In the modified vehicle driving force control apparatus shown in FIGS. 10-12F, engine TCS intervention threshold value Tslip is rapidly altered down to the predetermined low threshold value Tslip1 (<Tslip0), regardless of the magnitude of subsidiary-drive-wheel acceleration slip of rear road wheels 3L, 3R. In lieu thereof, engine TCS intervention threshold value Tslip may be a variable. That is, in order to ensure a better starting point of the engine TCS, it is more preferable that engine TCS intervention threshold value Tslip decreases, as the rear-wheel acceleration slip rate increases.

The entire contents of Japanese Patent Application No. 2004-172588 (filed Jun. 10, 2004) are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A driving force control apparatus for an automotive vehicle employing an engine to drive a main drive wheel, a generator driven by the engine, and a motor driven by an electric power output generated by the generator to drive a subsidiary drive wheel, comprising:
 (a) subsidiary drive wheel acceleration slip estimation circuitry to estimate an acceleration slip rate of the subsidiary drive wheel;
 (b) electric power output suppression circuitry to suppress the electric power output of the generator when the estimated subsidiary drive wheel acceleration slip rate exceeds a predetermined slip rate; and
 (c) subsidiary drive wheel acceleration slip period engine output torque reduction circuitry to reduce an engine output torque in response to suppressing the electric power output.

2. A driving force control apparatus for an automotive vehicle employing an engine to drive a main drive wheel, a generator driven by the engine, and a motor driven by an electric power output generated by the generator to drive a subsidiary drive wheel, comprising:
 (a) subsidiary drive wheel acceleration slip estimation circuitry to estimate an acceleration slip rate of the subsidiary drive wheel;
 (b) electric power output suppression circuitry to suppress the electric power output of the generator by a reduced value when the estimated subsidiary drive wheel acceleration slip rate exceeds a predetermined slip rate; and
 (c) target engine output torque reduction circuitry to reduce a target engine output torque by a load torque value corresponding to the reduced value of the electric power output in response to suppressing the electric power output.

3. The driving force control apparatus as claimed in claim 2, further comprising:
 (d) main drive wheel acceleration slip estimation circuitry to estimate an acceleration slip rate of the main drive wheel; and
 (e) main drive wheel acceleration slip period engine output torque suppression circuitry to suppress an engine output torque by a reduced value determined based on the estimated main drive wheel acceleration slip rate regardless of a driver-required vehicle acceleration when the estimated main drive wheel acceleration slip rate exceeds an engine traction-control-system (TCS) intervention threshold value.

4. The driving force control apparatus as claimed in claim 3, wherein engine output torQue suppression initiated by a first TCS system having the target engine output torque reduction circuitry and engine output torque suppression initiated by a second TCS system having the main drive wheel acceleration slip period engine output torque suppression circuitry are executed separately from each other.

5. The driving force control apparatus as claimed in claim 3, wherein the electric power output of the generator is set to a power output value corresponding to a surplus engine torque determined based on the estimated main drive wheel acceleration slip rate when the estimated main drive wheel acceleration slip rate exceeds a power-generation threshold value, and the TCS intervention threshold value is preset to be higher than the power-generation threshold value.

6. A driving force control apparatus for an automotive vehicle employing an engine to drive a main drive wheel, a generator driven by the engine, and a motor driven by an electric power output generated by the generator to drive a subsidiary drive wheel, comprising:
 (a) subsidiary drive wheel acceleration slip estimation circuitry to estimate an acceleration slip rate of the subsidiary drive wheel;
 (b) electric power output suppression circuitry to suppress the electric power output of the generator when the estimated subsidiary drive wheel acceleration slip rate exceeds a predetermined slip rate;
 (c) main drive wheel acceleration slip estimation circuitry to estimate an acceleration slip rate of the main drive wheel;
 (d) main drive wheel acceleration slip period engine output torque suppression circuitry to suppress an engine output torque by a reduced value determined based on the estimated main drive wheel acceleration slip rate regardless of a driver-required vehicle acceleration when the estimated main drive wheel acceleration slip rate exceeds an engine traction-control-system (TCS) intervention threshold value; and
 (e) acceleration slip threshold value alteration circuitry to alter the TCS intervention threshold value to a predetermined low threshold value lower than an initial threshold value, when the estimated subsidiary drive wheel acceleration slip rate exceeds the predetermined slip rate.

7. The driving force control apparatus as claimed in claim 6, wherein the acceleration slip threshold value alteration circuitry gradually steps up the TCS intervention threshold value from the predetermined low threshold value to the initial threshold value, after the estimated subsidiary drive wheel acceleration slip rate has been reduced to below the predetermined slip rate.

8. An automotive vehicle comprising:
 an engine to drive a main drive wheel;
 a generator driven by the engine;
 a motor driven by an electric power output generated by the generator for driving a subsidiary drive wheel;
 sensors to detect slip conditions of the main drive wheel and the subsidiary drive wheel; and
 a controller being configured to be electrically connected to the engine, the motor, the generator, and the sensors, for controlling driving forces applied to the main drive wheel and the subsidiary drive wheel,
 wherein the controller comprises:
 (a) subsidiary drive wheel acceleration slip estimation circuitry to estimate a subsidiary drive wheel acceleration slip rate based on the slip condition of the subsidiary drive wheel;
 (b) electric power output suppression circuitry to suppress the electric power output of the generator when the estimated subsidiary drive wheel acceleration slip rate exceeds a predetermined slip rate; and
 (c) subsidiary drive wheel acceleration slip period engine output torque reduction circuitry to reduce an engine output torque in response to suppressing the electric power output.

9. The automotive vehicle as claimed in claim 8, wherein the controller further comprises;
 (d) main drive wheel acceleration slip estimation circuitry to estimate a main drive wheel acceleration slip rate based on the slip condition of the main drive wheel; and
 (e) main drive wheel acceleration slip period engine output torque suppression circuitry to suppress the engine output torque by a reduced value determined based on the estimated main drive wheel acceleration slip rate regardless of a driver-required vehicle acceleration when the estimated main drive wheel acceleration slip rate exceeds an engine traction-control-system (TCS) intervention threshold value.

10. The automotive vehicle as claimed in claim 9, wherein engine output torque suppression initiated by a first TCS system having the subsidiary drive wheel acceleration slip period engine output torque reduction circuitry and engine output torque suppression initiated by a second TCS system having the main drive wheel acceleration slip period engine output torque suppression circuitry are executed independently of each other.

11. The automotive vehicle as claimed in claim 9, wherein the subsidiary drive wheel acceleration slip period engine output torque reduction circuitry comprises target engine output torque reduction circuitry to reduce a target engine output torque by a load torque value corresponding to a reduced value of the electric power output in response to suppressing the electric power output.

12. The automotive vehicle as claimed in claim 9, wherein the subsidiary drive wheel acceleration slip period engine output torque reduction circuitry comprises acceleration slip threshold value alteration circuitry to alter the TCS intervention threshold value to a predetermined low threshold value lower than an initial threshold value, when the estimated subsidiary drive wheel acceleration slip rate exceeds the predetermined slip rate.

13. The automotive vehicle as claimed in claim 12, wherein the acceleration slip threshold value alteration circuitry gradually steps up the TCS intervention threshold value from the predetermined low threshold value to the initial threshold value, after the estimated subsidiary drive wheel acceleration slip rate has been reduced to below the predetermined slip rate.

14. The automotive vehicle as claimed in claim 9, wherein the electric power output of the generator is set to a power output value corresponding to a surplus engine torque determined based on the estimated main drive wheel acceleration slip rate when the estimated main drive wheel acceleration slip rate exceeds a power-generation threshold value, and the TCS intervention threshold value is preset to be higher than the power-generation threshold value.

15. A driving force control apparatus for an automotive vehicle employing an engine to drive a main drive wheel, a generator driven by the engine, and a motor driven by an electric power output generated by the generator to drive a subsidiary drive wheel, comprising:
(a) subsidiary drive wheel acceleration slip estimation means for estimating an acceleration slip rate of the subsidiary drive wheel;
(b) electric power output suppression means for suppressing the electric power output of the generator when the estimated subsidiary drive wheel acceleration slip rate exceeds a predetermined slip rate; and
(c) subsidiary drive wheel acceleration slip period engine output torque reduction means for reducing an engine output torque in response to suppressing the electric power output.

16. A method of controlling driving forces applied to a main drive wheel and a subsidiary drive wheel of an automotive vehicle employing an engine that drives the main drive wheel, a generator driven by the engine, and a motor driven by an electric power output generated by the generator to drive the subsidiary drive wheel, the method comprising:
estimating an acceleration slip rate of the subsidiary drive wheel;
suppressing the electric power output of the generator when the estimated subsidiary drive wheel acceleration slip rate exceeds a predetermined slip rate; and
reducing an engine output torque in response to suppressing the electric power output.

17. A method of controlling driving forces applied to a main drive wheel and a subsidiary drive wheel of an automotive vehicle employing an engine that drives the main drive wheel, a generator driven by the engine, a motor driven by an electric power output generated by the generator to drive the subsidiary drive wheel, and sensors that detect slip velocities of the main drive wheel and the subsidiary drive wheel and a driver-required vehicle acceleration, the method comprising:
estimating a main drive wheel acceleration slip rate based on the slip velocity of the main drive wheel;
estimating a subsidiary drive wheel acceleration slip rate based on the slip velocity of the subsidiary drive wheel;
calculating a first target motor torque based on the slip velocity of the main drive wheel;
calculating a second target motor torque based on the driver-required vehicle acceleration;
selecting a higher one of the first and second target motor torques as a selected target motor torque;
reducing the selected target motor torque by a reduced torque value determined based on the estimated subsidiary drive wheel acceleration slip rate when the estimated subsidiary drive wheel acceleration slip rate exceeds a predetermined slip rate;
suppressing the electric power output of the generator by a reduced value corresponding to the reduced torque value when the estimated subsidiary drive wheel acceleration slip rate exceeds the predetermined slip rate; and
reducing an engine output torque in response to suppressing the electric power output.

18. The method as claimed in claim 17, wherein reducing the engine output torque in response to suppressing the electric power output comprises reducing a target engine output torque by a load torque value corresponding to the reduced value of the electric power output in response to suppressing the electric power output.

19. The method as claimed in claim 17, further comprising:
suppressing the engine output torque by a reduced value determined based on the estimated main drive wheel acceleration slip rate regardless of the driver-required vehicle acceleration when the estimated main drive wheel acceleration slip rate exceeds an engine traction-control-system (TCS) intervention threshold value, and
wherein reducing the engine output torque in response to suppressing the electric power output comprises altering the TCS intervention threshold value to a predetermined low threshold value lower than an initial threshold value, when the estimated subsidiary drive wheel acceleration slip rate exceeds the predetermined slip rate.

20. The method as claimed in claim 19, further comprising gradually stepping up the TCS intervention threshold value from the predetermined low threshold value to the initial threshold value, after the estimated subsidiary drive wheel acceleration slip rate has been reduced to below the predetermined slip rate.

21. The method as claimed in claim 19, further comprising setting the electric power output of the generator to a power output value corresponding to a surplus engine torque determined based on the estimated main drive wheel acceleration slip rate when the estimated main drive wheel acceleration slip rate exceeds a power-generation threshold value, and
wherein the TCS intervention threshold value is preset to be higher than the power-generation threshold value.

* * * * *